(12) United States Patent
Marvi et al.

(10) Patent No.: US 11,380,469 B2
(45) Date of Patent: Jul. 5, 2022

(54) MAGNETICALLY ACTUATED TUNABLE SOFT ELECTRONICS

(71) Applicants: Hamidreza Marvi, Chandler, AZ (US); Mahdi Ilami, Tempe, AZ (US); Reza James Ahmed, Tempe, AZ (US)

(72) Inventors: Hamidreza Marvi, Chandler, AZ (US); Mahdi Ilami, Tempe, AZ (US); Reza James Ahmed, Tempe, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 271 days.

(21) Appl. No.: 16/809,999

(22) Filed: Mar. 5, 2020

(65) Prior Publication Data
US 2020/0286657 A1 Sep. 10, 2020

Related U.S. Application Data

(60) Provisional application No. 62/814,370, filed on Mar. 6, 2019.

(51) Int. Cl.
*H01F 7/06* (2006.01)
*H01F 7/20* (2006.01)
(Continued)

(52) U.S. Cl.
CPC ............. *H01F 7/064* (2013.01); *H01C 10/14* (2013.01); *H01F 7/20* (2013.01); *H01F 21/02* (2013.01); *H01G 5/01* (2013.01)

(58) Field of Classification Search
CPC . H01F 7/064; H01F 7/20; H01F 21/02; H01F 1/447; H01F 21/06; H01F 21/08; H01C 10/14; H01G 5/01; H01G 4/40
(Continued)

(56) References Cited

U.S. PATENT DOCUMENTS

| 4,687,596 A | 8/1987 | Borduz et al. |
| 2020/0324415 A1 | 10/2020 | Marvi et al. |

FOREIGN PATENT DOCUMENTS

| EP | 0206516 A2 | 12/1986 |
| WO | 2020191399 A1 | 9/2020 |

OTHER PUBLICATIONS

Assadsangabi, B., et al., "Ferrofluid-based variable inductor," 2012 IEEE 25th International Conference on Micro Electro Mechanical Systems (MEMS), Paris, France, 2012, 4 pages.
(Continued)

*Primary Examiner* — Dharti H Patel
(74) *Attorney, Agent, or Firm* — Withrow & Terranova, P.L.L.C.; Vincent K. Gustafson

(57) ABSTRACT

Tunable electronic units and associated systems, as well as methods for tuning characteristic properties of soft electronic units (e.g., inductance, capacitance, and resistance) and fabricating soft tunable planar inductors, axial inductors, capacitors, and resistors, are provided. Disclosed systems and methods enable standardized tuning of different types of soft electronic units (e.g., including a soft inductor, capacitor, and resistor, etc.), and enable remote tuning while maintaining a tuned value without expending power. In certain embodiments, electrical properties of the soft electronic units are tuned using a mobile component (e.g., ferrofluid and iron powder) dragged with a permanent magnet inside a soft fluidic channel. This may be used for applications and devices which need to be soft and flexible, such as implantable electronics, wearable devices, and skin electronics.

20 Claims, 14 Drawing Sheets

(51) Int. Cl.
  *H01G 5/01* (2006.01)
  *H01C 10/14* (2006.01)
  *H01F 21/02* (2006.01)
(58) Field of Classification Search
  USPC .......................................................... 361/160
  See application file for complete search history.

(56) References Cited

OTHER PUBLICATIONS

Borwick, R.L., et al., "Variable MEMS Capacitors Implemented Into RF Filter Systems," IEEE Transactions on Microwave Theory and Techniques, vol. 51, No. 1, Jan. 2003, 5 pages.
Buyantuev, B., et al., "Electrically Controlled Variable Inductors for Applications in Tunable Filters," IEEE 2018 22nd International Microwave and Radar Conference (MIKON), Poznan, Poland, 2018, 5 pages.
Carle, F., et al., "Development of magnetic liquid metal suspensions for magnetohydrodynamics," Physical Review Fluids, vol. 2, 2017, 14 pages.
Cheng, S., et al., "Microfluidic electronics," Lab on a Chip, vol. 12, 2012, 10 pages.
Choi, W.M., et al., "Biaxially Stretchable "Wavy" Silicon Membranes," Nano Letters, vol. 7, No. 6, 2007, 9 pages.
Dickey, M.D., "Emerging Applications of Liquid Metals Featuring Surface Oxides," ACS Applied Materials & Interfaces. vol. 6, 2014, 11 pages.
Gray, D.S., et al., "High-Conductivity Elastomeric Electronics," Advanced Materials, vol. 16, No. 5, Mar. 5, 2004, 5 pages.
Hartshorne, H., et al., "Ferrofluid-basedmicrochip pump and valve," Sensors and Actuators B: Chemical, vol. 99, 2004, 9 pages.
Hsu, Y.-Y., et al., "Polyimide-enhanced stretchable interconnects: design, fabrication, and characterization," IEEE Transactions on Electron Devices, vol. 58, No. 8, 2011, 9 pages.
Ito, Y., et al., "A 1.3-2.8 GHz Wide Range CMOS LC-VCO Using Variable Inductor," IEEE 2005 IEEE Asian Solid-State Circuits Conference, Hsinchu, Taiwan, 2005, 4 pages.
James, J., et al., "A Variable Inductor Based Tuning Method for ICPT Pickups," EEE 2005 International Power Engineering Conference, Singapore, 2005, 5 pages.
Jeon, J., et al., "On-Demand Magnetic Manipulation of Liquid Metal in Microfluidic Channel for Electrical Switching Application," Lab on a Chip, vol. 17, 2016, 12 pages.
Kaltenbrunner, M., et al., "Arrays of Ultracompliant Electrochemical Dry Gel Cells for Stretchable Electronics," Advanced Materials, vol. 22, Issue 18, 2010, 3 pages.
Khang, D.-Y., et al., "A stretchable form of single-crystal silicon for high-performance electronics on rubber substrates," Science, vol. 311, 2006, 5 pages.
Kim, D.-H., et al., "Materials and noncoplanar mesh designs for integrated circuits with linear elastic responses to extreme mechanical deformations," Proceedings of the National Academy of Sciences, vol. 105, Issue 48, 2008, 6 pages.
Kim, D.-H., et al., "Stretchable, Curvilinear Electronics Based on Inorganic Materials," Advanced Materials, vol. 22, Issue 19, 2010, 17 pages.
Lanzara, G., et al., "A Spider-Web-Like Highly Expandable Sensor Network for Multifunctional Materials," Advanced Materials, vol. 22, Issue 41, 2010, 6 pages.
Lazarus, N., et al., "Ferrofluid-based Stretchable Magnetic Core Inductors," Journal of Physics: Conference Series, vol. 660, 2015, 5 pages.
Lazarus, N., et al., "Magnetic Elastomers for Stretchable Inductors," ACS Applied Materials & Interfaces, vol. 7, Issue 19, 2015, 5 pages.
Lazarus, N., et al., "Multilayer liquid metal stretchable inductors," Smart Materials and Structures, vol. 23, Issue 8, 2014, 10 pages.
Lazarus, N., et al., "Stretchable inductor with liquid magnetic core," Materials Research Express, vol. 4, 2016, 10 pages.

Lewis, J.S., et al., "Thin-film permeation-barrier technology for flexible organic light-emitting devices," IEEE Journal of Selected Topics in Quantum Electronics, vol. 10, Issue 1, 2004, 13 pages.
Liu, S., et al., "Design and characterization of a single channel two-liquid capacitor and its application to hyperelastic strain sensing," Lab on a Chip, vol. 15, 2015, 10 pages.
Liu, Y., et al., "Lab-on-Skin: A Review of Flexible and Stretchable Electronics for Wearable Health Monitoring," ACS Nano, vol. 11, Issue 10, 2017, 66 pages.
Love, L.J., et al., "Ferrofluid field induced flow formicrofluidic applications," IEEE/ASME Transactions on Mechatronics, vol. 10, No. 1, 2005, 9 pages.
Lu, T. et al., "Soft Anisotropic Conductors as Electric Vias for Ga-Based Liquid Metal Circuits," ACS Applied Materials & Interfaces, vol. 7, Issue 48, 2015, 7 pages.
Majidi, C., "Soft-Matter Engineering for Soft Robotics," Advanced Materials Technologies, vol. 4, 2019, 13 pages.
Mehta, R.V., et al., "Magnetic properties of laboratory synthesized magnetic fluid and their temperature dependence," Journal of Magnetism and Magnetic Materials, vol. 132, 1994, 6 pages.
Oh, D.-W., et al., "A microfluidic chaotic mixer using ferrofluid," Journal of Micromechanics and Microengineering, vol. 17, 2007, 7 pages.
Oh, J.Y., et al., "Ice-Templated Bimodal-PorousSilver Nanowire/PDMS Nanocomposites for Stretchable Conductor," ACS Applied Materials & Interfaces, vol. 6, 2018, 21 pages.
Pamme, N., "Magnetism and microfluidics," Lab on a Chip, vol. 6, 2006, 15 pages.
Pang, C., et al., "Recent advances in flexible sensors for wearable and implantable devices," Journal of Applied Polymer Science, vol. 130, Issue 3, 2013, 13 pages.
Pant, R.P., et al., "Synthesis and characterization of ferrofluid-conducting polymer composite," Indian Journal of Engineering and Materials Sciences, vol. 11, 2004, 4 pages.
Park, S., et al., "Silicones for Stretchable and DurableSoft Devices," ACS Applied Materials & Interfaces, vol. 3, 2018, 8 pages.
Polcar, P., et al., "Magnetic Field Controlled Capacitor," Journal of Electrical Engineering, vol. 67, No. 3, 2016, 4 pages.
Rogers, J.A., et al., "Materials and Mechanics for Stretchable Electronics," Science, vol. 327, 2010, 5 pages.
Rosset, S., et al., "Metal Ion Implantation for the Fabrication of Stretchable Electrodes on Elastomers," Advanced Functional Materials, vol. 19, 2009, 9 pages.
Tan, S.-H., et al., "Formation and manipulation of ferrofluid droplets at a microfluidic T-junction," Journal of Micromechanics and Microengineering, vol. 20, Issue 4, 2010, 10 pages.
Torres Sevilla, G.A., et al., "Flexible Nanoscale High-Performance FinFETs," ACS Nano, vol. 8, Issue 10, 2014, 7 pages.
Trung, T.Q., et al., "Recent Progress on Stretchable Electronic Devices with Intrinsically Stretchable Components," Advanced Materials, vol. 29, Issue 3, 2017, 29 pages.
Wagner, S., et al., "Materials for stretchable electronics," MRS Bulletin, vol. 37, Issue 3, 2012, 7 pages.
Wang, C., et al., "Materials and Structures toward Soft Electronics," Advanced Materials, vol. 30, Issue 50, 2018, 49 pages.
Wang, M., et al., "A reconfigurable liquid metal antenna driven by electrochemically controlled capillarity," Journal of Applied Physics, vol. 117, 2015, 5 pages.
Wölfle, W.H., et al., "Quasi-Active Power Factor Correction With a Variable Inductive Filter: Theory, Design and Practice," IEEE Transactions on Power Electronics, vol. 18, Issue 1, 2003, 8 pages.
Wu, W., "Stretchable electronics: functional materials, fabrication strategies and applications," Science and Technology of Advanced Materials, vol. 20, No. 1, 2019, 38 pages.
Xia, Y., et al., "Soft Lithography," Angewandte Chemie International Edition, vol. 27, 1998, 26 pages.
Yao, S., et al., "Nanomaterial-Enabled Stretchable Conductors: Strategies, Materials and Devices," Advanced Materials, vol. 27, Issue 9, 2015, 32 pages.
Yao, S., et al., "Nanomaterial-Enabled Wearable Sensors for Healthcare," Advanced Healthcare Materials, vol. 7, Issue 1, 2018, 27 pages.

(56) References Cited

OTHER PUBLICATIONS

Zeng, J., et al., "Magnetic separation of particles and cells in ferrofluid flow through a straight microchannel using two offset magnets," Journal of Magnetism and Magnetic Materials, vol. 346, 2013, 6 pages.
Zou, J., et al., "Development of a Wide Tuning Range MEMS Tunable Capacitor for Wireless Communication Systems," IEEE International Electron Devices Meeting. Technical Digest, San Francisco, California, USA, 2000, 4 pages.

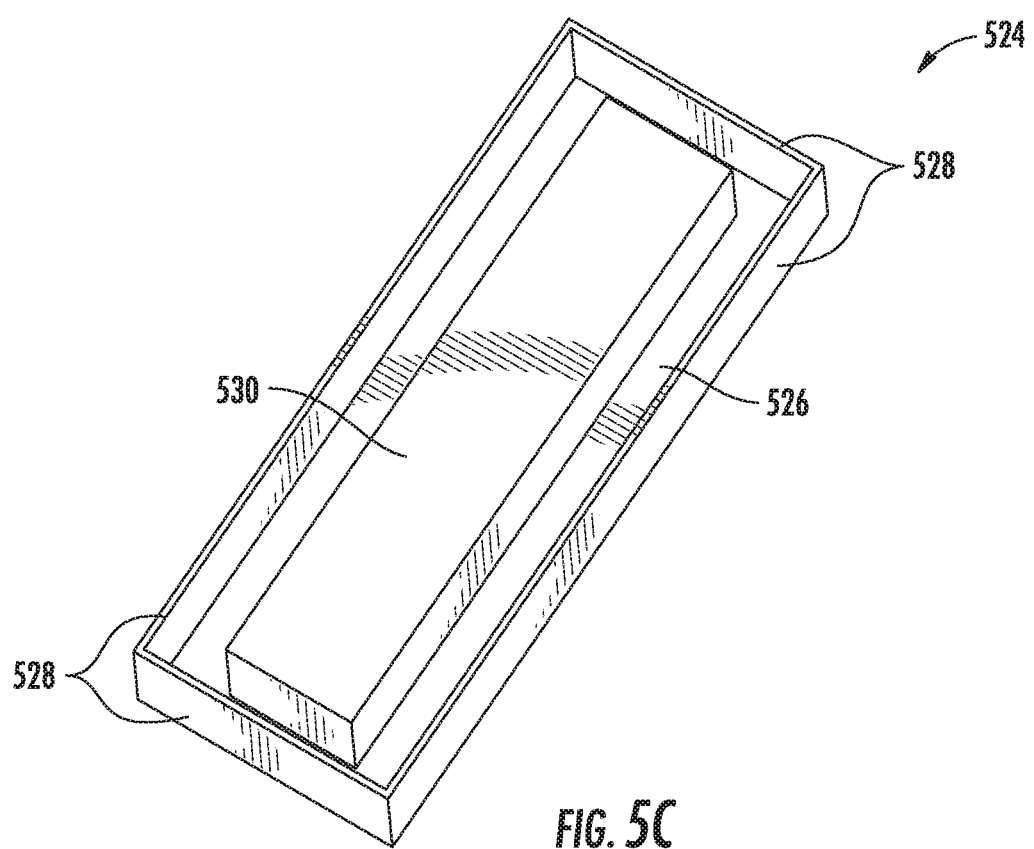

| CASE | min (L) ± SEM | max (L) ± SEM | min (Q) ± SEM | max (Q) ± SEM | min (SRF) ± SEM | max (SRF) ± SEM |
| --- | --- | --- | --- | --- | --- | --- |
| (1) | 4.092 ± 0.069 | 4.154 ± 0.079 | 21.7 ± 0.4 | 23.5 ± 0.6 | 32.8 ± 1.9 | 33.0 ± 2.0 |
| (2) | 3.320 ± 0.118 | 3.347 ± 0.117 | 20.2 ± 1.2 | 21.4 ± 1.1 | 36.2 ± 2.3 | 36.3 ± 2.4 |
| (3) | 2.994 ± 0.303 | 3.081 ± 0.208 | 16.6 ± 2.2 | 17.9 ± 1.2 | 37.0 ± 0.8 | 37.3 ± 0.6 |
| (4) | 3.319 ± 0.069 | 3.330 ± 0.103 | 21.6 ± 0.9 | 22.0 ± 1.4 | 36.2 ± 2.3 | 37.5 ± 0.3 |
| (5) | 4.025 ± 0.070 | 4.081 ± 0.058 | 23.1 ± 0.6 | 25.1 ± 1.3 | 32.9 ± 2.0 | 33.4 ± 2.2 |
| (6) | 3.280 ± 0.047 | 3.753 ± 0.196 | 18.4 ± 0.4 | 23.5 ± 2.9 | 34.3 ± 1.4 | 35.7 ± 2.0 |
| (7) | 3.309 ± 0.034 | 4.000 ± 0.056 | 19.1 ± 0.7 | 26.6 ± 0.7 | 33.5 ± 2.1 | 35.5 ± 2.3 |
| (8) | 3.327 ± 0.066 | 3.953 ± 0.026 | 21.9 ± 1.3 | 27.1 ± 1.1 | 34.2 ± 2.1 | 37.4 ± 0.3 |
| (9) | 3.318 ± 0.120 | 3.990 ± 0.052 | 21.9 ± 1.2 | 26.7 ± 0.9 | 33.7 ± 2.0 | 36.2 ± 2.3 |

| CASE | min (L) ± SEM | max (L) ± SEM | min (Q) ± SEM | max (Q) ± SEM | min (SRF) ± SEM | max (SRF) ± SEM |
|---|---|---|---|---|---|---|
| (1) | 0.653 ± 0.007 | 0.695 ± 0.039 | 8.4 ± 0.4 | 9.8 ± 1.0 | 103.5 ± 4.3 | 105.5 ± 1.9 |
| (2) | 0.427 ± 0.016 | 0.457 ± 0.009 | 21.6 ± 5.2 | 43.1 ± 9.9 | 122.4 ± 2.5 | 125.8 ± 2.5 |
| (3) | 0.422 ± 0.020 | 0.438 ± 0.022 | 27.3 ± 2.0 | 52.2 ± 11.8 | 123.5 ± 3.5 | 125.7 ± 3.9 |
| (4) | 0.419 ± 0.018 | 0.487 ± 0.061 | 50.3 ± 1.4 | 58.9 ± 14.9 | 111.1 ± 4.4 | 120.5 ± 8.2 |
| (5) | 0.517 ± 0.045 | 0.526 ± 0.049 | 29.6 ± 8.1 | 35.1 ± 11.3 | 115.3 ± 1.7 | 116.0 ± 1.5 |
| (6) | 0.457 ± 0.009 | 0.510 ± 0.016 | 21.6 ± 5.2 | 42.1 ± 8.1 | 116.6 ± 3.2 | 122.4 ± 2.5 |
| (7) | 0.438 ± 0.022 | 0.538 ± 0.023 | 27.3 ± 2.0 | 59.8 ± 24.9 | 112.9 ± 0.7 | 123.5 ± 3.5 |
| (8) | 0.443 ± 0.037 | 0.467 ± 0.028 | 59.8 ± 13.1 | 79.3 ± 12.9 | 114.6 ± 6.4 | 118.2 ± 10.6 |
| (9) | 0.417 ± 0.016 | 0.490 ± 0.028 | 58.8 ± 15.3 | 75.3 ± 6.8 | 113.1 ± 9.1 | 121.4 ± 9.6 |

| CASE | min (C) ± SEM | max (C) ± SEM | min (Q) ± SEM | max (Q) ± SEM | min (SRF) ± SEM | max (SRF) ± SEM |
|---|---|---|---|---|---|---|
| (1) | 2.882 ± 0.138 | 2.977 ± 0.169 | 16.3 ± 3.5 | 19.6 ± 1.7 | 877.6 ± 21.1 | 915.5 ± 15.6 |
| (2) | 3.086 ± 0.064 | 3.108 ± 0.011 | 15.0 ± 0.2 | 17.6 ± 1.3 | 854.0 ± 44.3 | 864.6 ± 37.0 |
| (3) | 3.035 ± 0.255 | 3.082 ± 0.180 | 24.7 ± 6.5 | 26.8 ± 7.6 | 863.8 ± 21.2 | 888.4 ± 43.5 |
| (4) | 2.947 ± 0.195 | 2.977 ± 0.217 | 16.1 ± 1.6 | 20.6 ± 9.1 | 906.3 ± 33.8 | 920.4 ± 27.0 |
| (5) | 2.797 ± 0.134 | 2.977 ± 0.169 | 14.3 ± 2.5 | 19.6 ± 1.7 | 877.6 ± 21.1 | 959.9 ± 12.1 |
| (6) | 2.854 ± 0.174 | 3.218 ± 0.086 | 15.5 ± 1.8 | 23.2 ± 7.7 | 814.8 ± 13.6 | 946.4 ± 26.2 |
| (7) | 2.855 ± 0.201 | 3.059 ± 0.162 | 17.9 ± 5.7 | 21.7 ± 3.8 | 876.0 ± 17.1 | 951.5 ± 29.0 |
| (8) | 2.950 ± 0.288 | 2.981 ± 0.213 | 15.4 ± 4.1 | 23.6 ± 10.4 | 904.4 ± 31.2 | 920.4 ± 57.5 |
| (9) | 2.802 ± 0.113 | 2.930 ± 0.190 | 13.4 ± 1.5 | 18.3 ± 4.9 | 921.2 ± 25.4 | 955.0 ± 12.0 |

| CASE | min ± SEM | max ± SEM |
| --- | --- | --- |
| (1) | 0.359 ± 0.007 | 0.425 ± 0.028 |
| (2) | 0.353 ± 0.004 | 0.354 ± 0.005 |
| (3) | 0.359 ± 0.007 | 1.026 ± 0.006 |
| (4) | 0.353 ± 0.004 | 1.012 ± 0.003 | though
MAGNETICALLY ACTUATED TUNABLE SOFT ELECTRONICS

RELATED APPLICATIONS

This application claims priority to U.S. Provisional Patent Application No. 62/814,370, filed Mar. 6, 2019, wherein the disclosure of such application is hereby incorporated by reference herein in its entirety.

TECHNICAL FIELD

This disclosure relates to tunable electronics. In particular, the present disclosure relates to magnetically actuated tunable soft electronics.

BACKGROUND

For applications where flexibility, stretchability, and biocompatibility are required, traditional rigid circuits may be replaced by soft electronics. Soft electronics may be used in a variety of technologies, such as in health care and robotics. For example, in healthcare, implantable devices may need remote tuning, and/or wearable sensors and point of care devices may be benefited by tunable soft electronic units. In soft robotics, tunable electronics (e.g., tunable filters, receivers and transmitters) may be used for tuning proportional-integral-derivative (PID) controllers.

Variable electronic components are used for applications requiring tuning (e.g., tunable filters, transmitters, and receivers, etc.). For example, variable resistors are used as control inputs for electronic units. Variable inductors are used for voltage regulation, tuning the frequencies of inductively-coupled power transfer systems, and power factor correction. Variable capacitors are used for tuning the resonance frequency and capacitive reactance of electrical circuits. In addition, variable components may be used in tunable filters, receivers, and transmitters.

However, there is no standardized or uniform method of tuning electronic components (e.g., capacitors, resistors, inductors) for variable soft electronics (e.g., electronics that are stretchable, flexible, bendable), particularly for soft electronics that are implanted in a human body or are otherwise inaccessible. Many conventional variable electronic components require the continuous expenditure of power to maintain the tuned value, and furthermore, these variable soft electronics require direct access to (i.e., conductive electrical communication with) devices to permit tuning or adjustment. A need therefore exists in the art for tunable soft electronics and associated methods that address limitations associated with conventional devices and methods.

SUMMARY

Disclosed herein are tunable electronic units and associated systems, and well as methods for tuning characteristic properties of soft electronic units (e.g., inductance, capacitance, and resistance) and fabricating soft tunable planar inductors, axial inductors, capacitors, and resistors. Various systems and methods disclosed herein enable standardized tuning of different types of soft electronic units (e.g., including a soft inductor, capacitor, and resistor, etc.), and enable remote tuning while maintaining a tuned value without expending power.

Electrical properties of the soft electronic units are tuned using a mobile component, such as a mixture of ferrofluid and iron powder dragged with a permanent magnet inside a soft fluidic channel (e.g., made of polydimethylsiloxane (PDMS)). This provides a standardized method (e.g., identical mechanism) to remotely tune (i.e., vary the characteristic values of) a soft variable resistor, capacitor, and inductor, etc., and maintain the tuned value without expending power. This may be used for applications and devices which need to be soft and flexible, such as implantable electronics, wearable devices, and skin electronics.

The effects of position and quantity of the ferrofluid and iron powder may be provided over a range of frequencies, and may induce changes in inductance, capacitance, resistance, quality factor, and self-resonance frequency. The position effect in particular has an impact on changing inductance, capacitance, and/or resistance.

In one aspect, the disclosure relates to a tunable electronic unit, including a body, at least one mobile component, and at least one variable electrical component. The body defines a fluidic channel. The at least one mobile component is configured to move within the fluidic channel responsive to movement of at least one magnet external to the fluidic channel. The at least one magnet is external to and separate from the tunable electronic unit. The at least one variable electrical component is configured to be tuned to a tuned setting depending on a position of the at least one mobile component within the fluidic channel.

In certain embodiments, the tunable electronic unit is flexible. In certain embodiments, the at least one variable electrical component is maintained at the tuned setting without expending power by maintenance of the position of the at least one mobile component within the fluidic channel. In certain embodiments, the at least one variable electrical component includes a resistor positioned within the fluidic channel. In certain embodiments, the at least one magnet includes at least one block magnet with poles aligned along a width of the fluidic channel. In certain embodiments, the at least one variable electrical component includes a capacitor including charge accumulation elements positioned on opposing sides of the fluidic channel. In certain embodiments, the at least one magnet includes a block magnet with poles aligned along a length of the fluidic channel. In certain embodiments, the at least one variable electrical component includes a planar inductor positioned external to the fluidic channel with at least a portion of the body positioned between the planar inductor and the at least one mobile component. In certain embodiments, the at least one magnet includes a block magnet with poles aligned along a length of the fluidic channel. In certain embodiments, the at least one variable electrical component includes an axial inductor positioned external to the fluidic channel with at least a portion of the body positioned between the axial inductor and the at least one mobile component. In certain embodiments, the at least one magnet includes a ring magnet positioned around the fluidic channel (e.g., the ring magnet axially magnetized). In certain embodiments, the at least one variable electrical component includes a resistor, a capacitor, and an inductor. In certain embodiments, other magnetic configurations may be used.

In certain embodiments, the at least one mobile component includes iron powder. In certain embodiments, the at least one mobile component includes a ferrofluid. In certain embodiments, the at least one mobile component includes iron powder and a ferrofluid.

In certain embodiments, the tunable electronic unit includes a local magnet external to the fluidic channel with at least a portion of the body positioned between the local magnet and the at least one mobile component. The local magnet is configured to move responsive to at least one remote magnet.

In certain embodiments, a tunable electronic system includes the tunable electronic unit. In certain embodiments, the at least one magnet includes an electromagnetic coil system.

In another aspect, the disclosure relates to a method for tuning a tunable electronic unit. The method includes positioning at least one magnet external to a fluidic channel of a body of a tunable electronic unit, wherein the at least one magnet is external to and separate from the tunable electronic unit. The method further includes tuning at least one variable electrical component of the tunable electronic unit to a tuned setting by moving the at least one magnet along a length of the fluidic channel to an external tuned position, thereby causing at least one mobile component to move within the fluidic channel to an internal tuned position.

In certain embodiments, the tunable electronic unit is flexible. In certain embodiments, the method further includes maintaining the external tuned position of the at least one magnet to maintain the tuned setting of the tunable electronic unit without expending power.

In certain embodiments, the at least one variable electrical component includes at least one of a capacitor, an inductor, or a resistor. In certain embodiments, the at least one mobile component includes at least one of iron powder or a ferrofluid. In certain embodiments, the at least one magnet comprises at least one remote magnet, and moving the at least one remote magnet along a length of the fluidic channel causes movement of a local magnet external to the fluidic channel with at least a portion of the body positioned between the local magnet and the at least one mobile component. In certain embodiments, the method further includes removing the at least one remote magnet to set the local magnet at a position relative to the fluidic channel so that the local magnet maintains the at least one mobile component in the internal tuned position within the fluidic channel without expending power.

In another aspect, any one or more aspects or features described herein may be combined with any one or more other aspects or features for additional advantage.

Other aspects and embodiments will be apparent from the detailed description and accompanying drawings.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

FIG. 5C is a perspective view of mold for the body of the tunable electronic unit with the resistor of FIG. 5A.

DETAILED DESCRIPTION

Figure 1A:
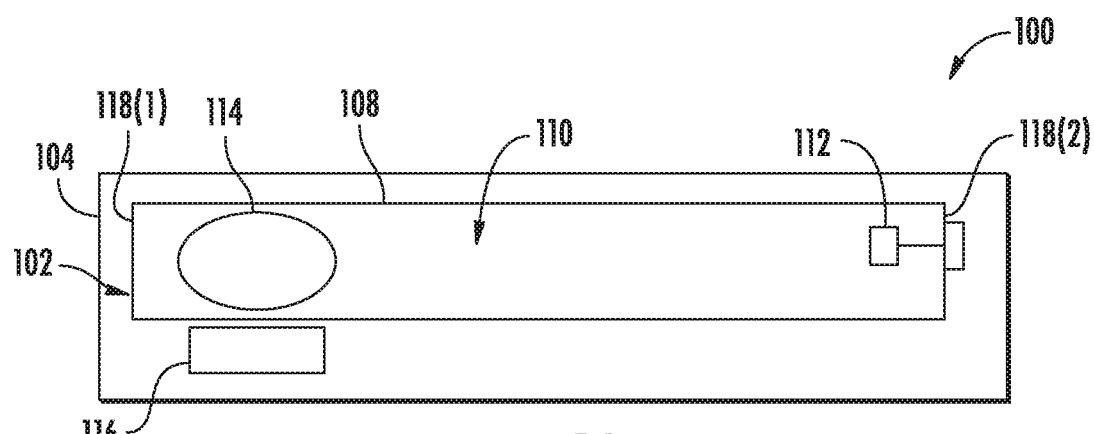
FIG. 1A is a diagram illustrating a tunable electronic system including a tunable electronic unit within an enclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Disclosed herein is a system and method of tuning characteristic properties of soft electronic units (e.g., inductance, capacitance, and resistance), and fabrication of soft tunable planar inductors, axial inductors, capacitors, and resistors. The system and method provide a standardized method for tuning different types of soft electronic units (e.g., including a soft inductor, capacitor, and resistor, etc.), as well as enable remote tuning while maintaining a tuned value without expending power.

Electrical properties of the soft electronic units are tuned using a mobile component, such as a mixture of ferrofluid and iron powder dragged with a permanent magnet inside a soft fluidic channel (e.g., made of polydimethylsiloxane (PDMS)). This provides a standardized method (e.g., identical mechanism) to remotely tune (i.e., vary the characteristic values of) a soft variable resistor, capacitor, and inductor, etc. and maintain the tuned value without expending power. For example, inductance, capacitance, resistance, Q-factor and/or self-resonance frequency (SRF) of the electrical units may vary for different positions and quantities of the mobile component. This may be used for applications and devices which need to be soft and flexible, such as implantable electronics, wearable devices, and skin electronics.

Applicant hereby incorporates herein by reference in its entirety Ilami, et al., "Magnetically Actuated Tunable Soft Electronics," ACS Omega, 4, 21242-21250 (2019) (https://pubs.acs.org/doi/pdf/10.1021/acsomega.9b02716), as well as "Supporting Information, Magnetically Actuated Tunable Soft Electronics" (https://pubs.acs.org/doi/suppl/10.1021/acsomega.9b02716/suppl_file/ao9b02716_si_0 01.pdf).

Figure 1B:
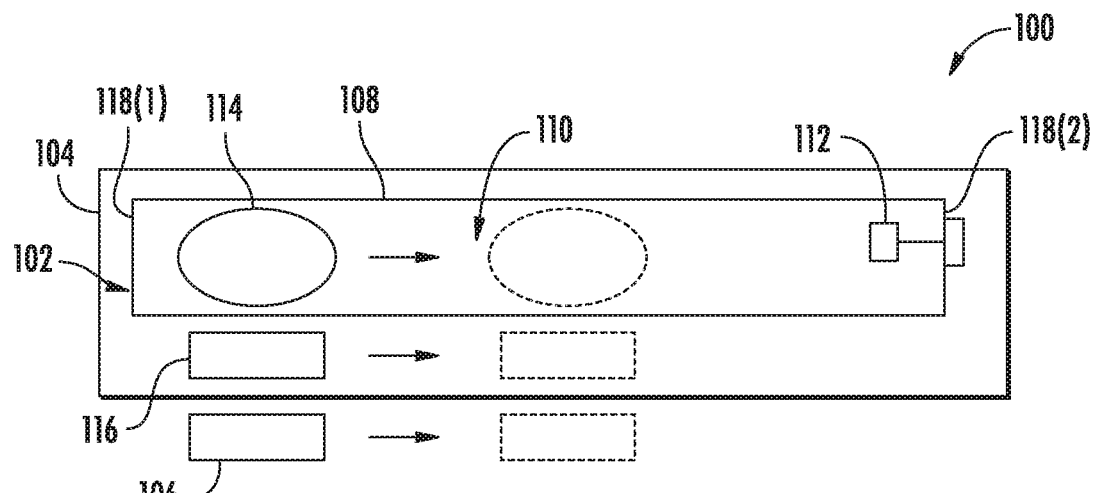
FIG. 1B is a diagram illustrating remote tuning the tunable electronic unit of FIG. 1A using a remote magnet.
Figure 1C:
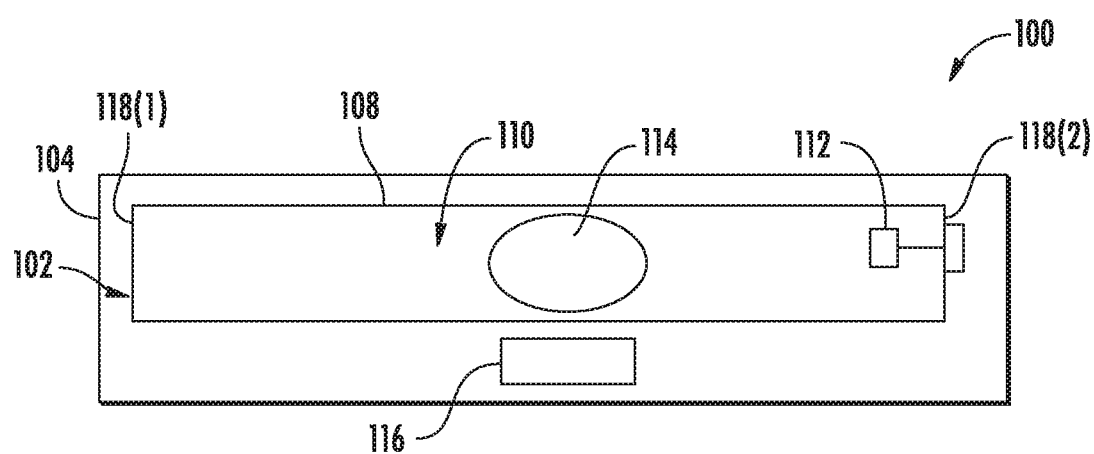
FIG. 1C is a diagram illustrating maintenance of a tuned value of the tunable electronic unit of FIG. 1A using a local magnet without expending power.

FIGS. 1A-1C are diagrams illustrating a tunable electronic system 100 (e.g., soft tunable electronic system) including a tunable electronic unit 102 (e.g., soft tunable electronic unit) within an enclosure 104 and a remote magnet 106 (may also be referred to as a remote magnetic source) to remotely tune the tunable electronic unit 102 from outside the enclosure 104 (e.g., human body). In certain embodiments, the tunable electronic unit 102 is flexible. Tunable soft electronics are applicable where flexibility, stretchability, and/or bio-compatibility are desired or required, such as in wearable electronic devices, implantable electronic devices, and/or soft robotics. For example, such technology can be implemented in electric skins for medical purposes and/or soft robotics for mobility in highly confined spaces. Microfluidics includes fluid manipulation on a very small scale, and with a conductive fluid may be used to create soft, stretchable electronics on a similarly small scale. In soft electronic applications, microfluidic channels provide ease of fabrication and low cost. Due to the implementation of soft, stretchable, insulating mediums for microfluidic fabrication, microfluidic electronics exhibit flexible and stretchable characteristics. In addition to microfluidic electronic components made of static liquid metal, mobile liquid metals can also be utilized in such components.

In certain embodiments, the tunable electronic unit 102 includes a body 108 defining a fluidic channel 110 (e.g., soft fluidic channel), a variable electrical component 112, a mobile component 114 configured to move within the fluidic channel 110, and at least one magnet (e.g., local magnet 116) external to the fluidic channel 110. In certain embodiments, the fluidic channel 110 includes a first end 118(1) and a second end 118(2) opposite the first end 118(1). In certain embodiments, the body 108 includes PDMS (polydimethylsiloxane), such as Sylgard 184 PDMS (e.g., using a mixing ratio of 1:10). In certain embodiments, the body 108 is fabricated by 3D printing (using PLA) and/or a soft lithography process (using PDMS). In certain embodiments, the molds are made of PLA (polylactide). In certain embodiments, after printing molds for making the body 108, silicone oil may be applied to the surface for ease of demolding. The mold may then be put on a hot plate set to 90° C. for 10 minutes. After mixing and degassing the PDMS, it may be poured in the molds and degassed again. Then the molds may be placed on the hot plate set to 90° C. for three hours.

In certain embodiments, the variable electrical component 112 is statically positioned proximate to the second end 118(2) of the fluidic channel 110. The variable electrical component 112 is configured to be tuned to a tuned setting depending on a position of the mobile component 114 within the fluidic channel 110 (and relative to the variable electrical component 112). The variable electrical component 112 includes a resistor, a capacitor, and/or an inductor. In certain embodiments, the variable electrical components 112 further include copper wires, copper plates, and/or liquid metal (e.g., to achieve more flexible and stretchable components).

The mobile component 114 is positioned within and moveable within the fluidic channel 110. The position and effect of the mobile component 114 (which travels through the fluidic channel 110) relative to the variable electrical component 112 tunes characteristics of the variable electrical component 112. In other words, the mobile component 114 placed inside the fluidic channel 110 adds variability to the variable electrical component 112. The mobile component 114 may be chosen among magnetically responsive materials for remote control and encapsulation in the fluidic channel 110. In certain embodiments, the mobile component 114 includes at least one of iron powder (e.g., dry iron particles) and/or ferrofluid (e.g., Educational Innovation FF-310 bulk ferrofluid). In certain embodiments, the mobile component 114 can include ferrofluid mixed with dry iron particles. Ferrofluid is made of ferromagnetic particles suspended in a carrier fluid. The carrier fluid may be water or an organic solvent, and ferromagnetic particles may be covered with a surfactant to prevent them from clumping. The carrier fluid and surfactant can both be chosen from biocompatible materials (e.g., biocompatible ferrofluid). Although ferrofluids alone are non-conductive, liquid metal-based ferrofluids may be conductive.

The mobile component 114 includes one or more magnetically responsive materials, such that the mobile component 114 can be actuated remotely using a magnetic field, such as using the remote magnet 106. In other words, the mobile component 114 is responsive to movement of the local magnet 116 (may also be referred to as a local magnetic source), which is moved using the remote magnet 106 external to and separate from the tunable electronic unit 102. In certain embodiments, the remote magnet 106 includes an electromagnetic coil system.

The local magnet 116 is external to the fluidic channel 110, with at least a portion of the body 108 positioned between the local magnet 116 and the mobile component 114. The local magnet 116 is configured to move responsive to the remote magnet 106. In certain embodiments, the magnetic attraction between the local magnet 116 and the mobile component 114 maintains the position of the local magnet 116 and the mobile component 114 relative to the fluidic channel 110. Thus, the local magnet 116 maintains the tuned value of the variable electrical component 112 at the tuned setting without expending power by maintenance of the position of the mobile component 114 within the fluidic channel 110. One or more variable electrical components 112 (e.g., microfluidic soft variable resistors, capacitors, and/or inductors) can be tuned using the same remote, magnetic tuning method that does not expend power to maintain a set characteristic value. Thus, the remote magnet 106 and/or local magnet 116 control movement and maintain position of the mobile component 114 within the fluidic channel 110. It is noted that in certain embodiments, the local magnet 116 may be omitted, and the tunable electronic unit 102 tuned by only the remote magnet 106. In certain embodiments, the local magnet 116 is a permanent magnet. In certain embodiments, the remote magnet 106 is a permanent magnet and/or an electromagnet.

FIGS. 1A-1C illustrate tuning of the tunable electronic unit 102 within the enclosure 104. Referring to FIG. 1A, the local magnet 116 is positioned proximate to the first end 118(1) of the fluidic channel 110, which accordingly positions the mobile component 114 proximate to the first end 118(1). The variable electrical component 112 is set to a first tuned value based on the first position of the mobile component 114 relative to the variable electrical component 112.

Referring to FIG. 1B, the remote magnet 106 external to the enclosure 104 is positioned proximate to the first end 118(1) of the fluidic channel 110 and forms a magnetic coupling between the remote magnet 106 and the local magnet 116. Movement of the remote magnet 106 along the fluidic channel 110 also moves the local magnet 116 along the fluidic channel 110 due to the magnetic coupling between the remote magnet 106 and the local magnet 116 through the enclosure 104. Further, movement of the local magnet 116 along the fluidic channel 110 also moves the mobile component 114 along the fluidic channel 110 due to the magnetic coupling between the local magnet 116 and the mobile component 114 through the body 108. In this way, the remote magnet 106 moves from a first position proximate to the first end 118(1) of the fluidic channel 110 toward the second end 118(2) to a second position, and correspondingly moves the mobile component 114 from the first position to the second position.

Referring to FIG. 1C, the remote magnet 106 is removed at the second position. Once the remote magnet 106 is removed, the local magnet 116 stays at the second position. The mobile component 114 also stays at the second position due to the magnetic coupling with the local magnet 116. The variable electrical component 112 is set to a second tuned value based on the second position of the mobile component 114 relative to the variable electrical component 112. Thus, the tunable electronic unit 102 is maintained at the second tuned value by the local magnet 116 without expending power.

In certain embodiments, the remote magnet 106 actuates the local magnet 116 and moves the local magnet 116 to a desired tunable position. The local magnet 116 facilitates movement of the mobile component 114 to a desired tunable position. If the remote magnet 106 is removed, the local magnet 116 keeps the mobile component 114 at the tunable position. In other embodiments, the remote magnet 106 moves the mobile component 114 directly (e.g., for applications without a local magnet 116).

In certain embodiments, the tunable electronic unit 102 is configured to tune one or more characteristics of the variable electrical component 112 including inductance, capacitance, resistance, impedance, Q-factor and/or self-resonance frequency (SRF). Further, changing the mobile component 114 may also change such characteristics.

Figure 2A:
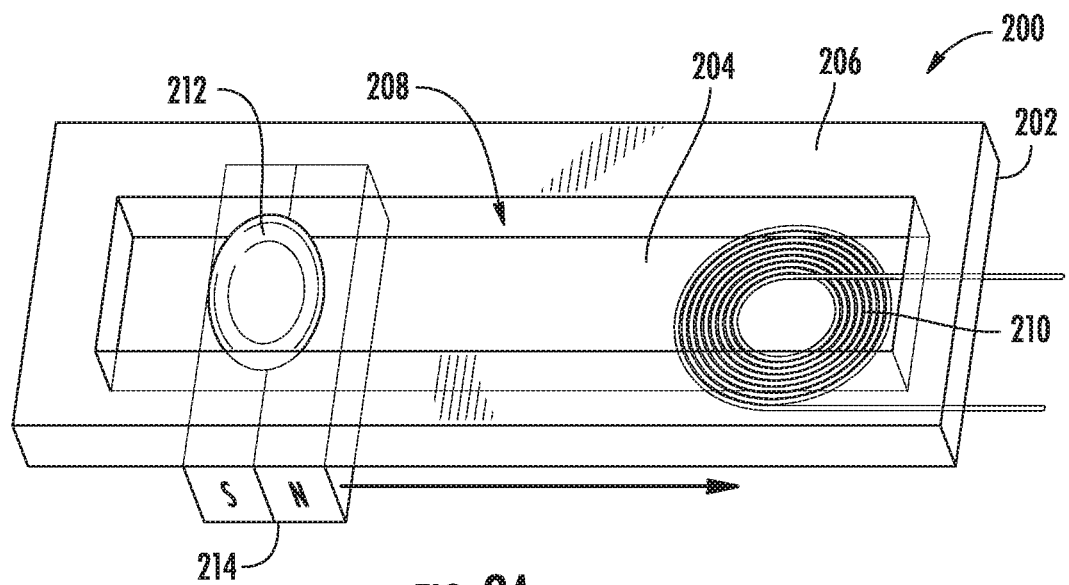
FIG. 2A is a perspective view of an embodiment of the tunable electronic unit of FIGS. 1A-1C incorporating a planar inductor.

FIGS. 2A-2D are views directed to an embodiment of the tunable electronic unit 102 of FIGS. 1A-1C incorporating a planar inductor. Referring to FIG. 2A, the tunable electronic unit 200 includes a body 202 with a bottom wall 204 and sidewalls 206 defining a fluidic channel 208 (e.g., soft fluidic channel), a variable electrical component including a planar inductor 210, a mobile component 212 configured to move within the fluidic channel 208, and a magnet 214 (e.g., remote magnet or local magnet) external to the fluidic channel 208. The position of the mobile component 212 relative to the planar inductor 210 affects the inductance of the tunable electronic unit 200.

The planar inductor 210 is positioned external to the fluidic channel 208, where at least a portion of the body 202 is positioned between the planar inductor 210 and the mobile component 212. As illustrated, both the planar inductor 210 and the magnet 214 are positioned beneath the body 202. However, in other embodiments, the planar inductor 210 may be positioned within the fluidic channel 208, or the planar inductor 210 and magnet 214 may be positioned on opposing sides of the body 202 (e.g., such that the body 202 is positioned between the planar inductor 210 and the magnet 214).

In certain embodiments, the magnet 214 includes a block magnet with poles aligned along a length L of the fluidic channel 208. In certain embodiments, the magnet 214 includes NdFeB, Grade N42 material with dimensions of 19 mm×9.5 mm×6.35 mm. In certain embodiments, Mouser Electronics wireless charging coils WE-WPCC may be used for the planar inductor 210. In certain embodiments, ten rounds of wire may be removed from the coils to bring the self-resonance frequency into the frequency range of a vector network analyzer (VNA).

Figure 2B:
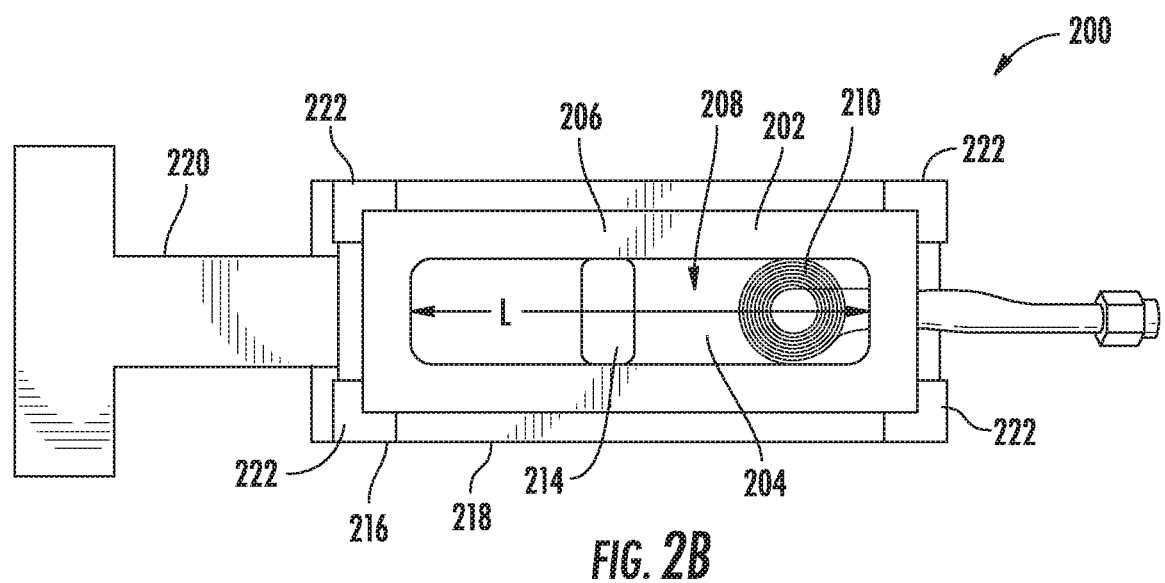
FIG. 2B is a top plan view of an embodiment of the tunable electronic unit with the planar inductor of FIG. 2A attached to a mounting platform.
Figure 2C:
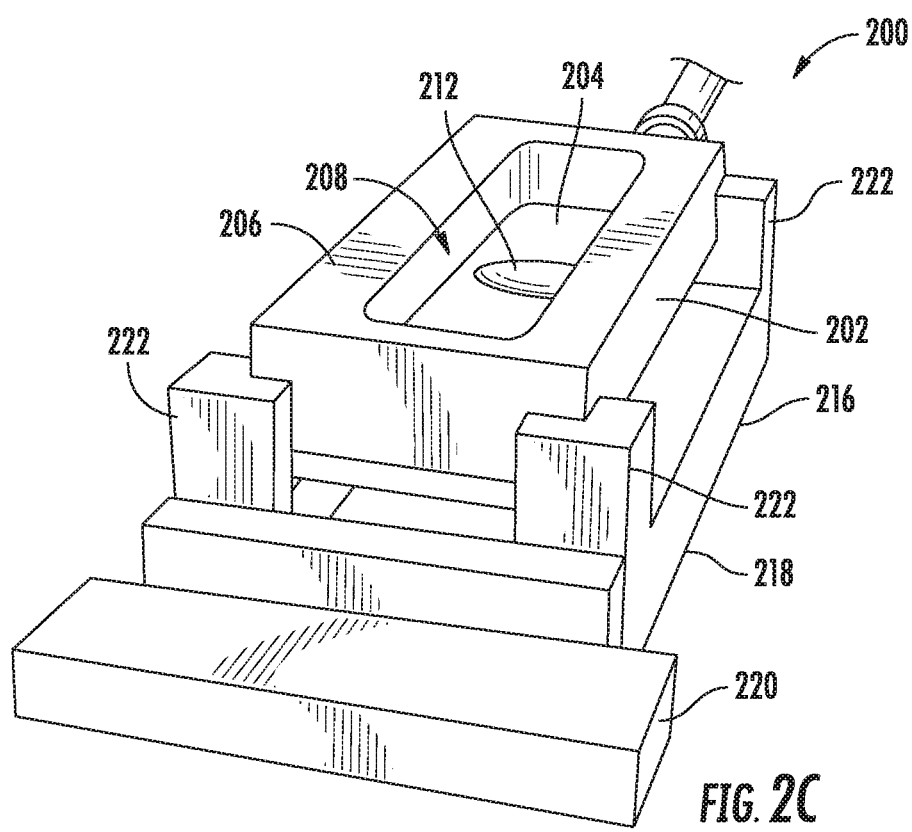
FIG. 2C is a perspective view of the tunable electronic unit and mounting platform of FIG. 2B.

FIGS. 2B-2C are views of an embodiment of the tunable electronic unit 200 with the planar inductor 210 of FIG. 2A attached to a mounting platform 216 (may also be referred to as a testing platform). The mounting platform 216 includes a base 218 and a slider 220 that is movable relative to the base 218. The body 202 is mounted in position by posts 222 of the base 218. The magnet 214 is attached to the slider 220 and moves relative to the length L of the fluidic channel 208 of the body 202.

Figure 2D:
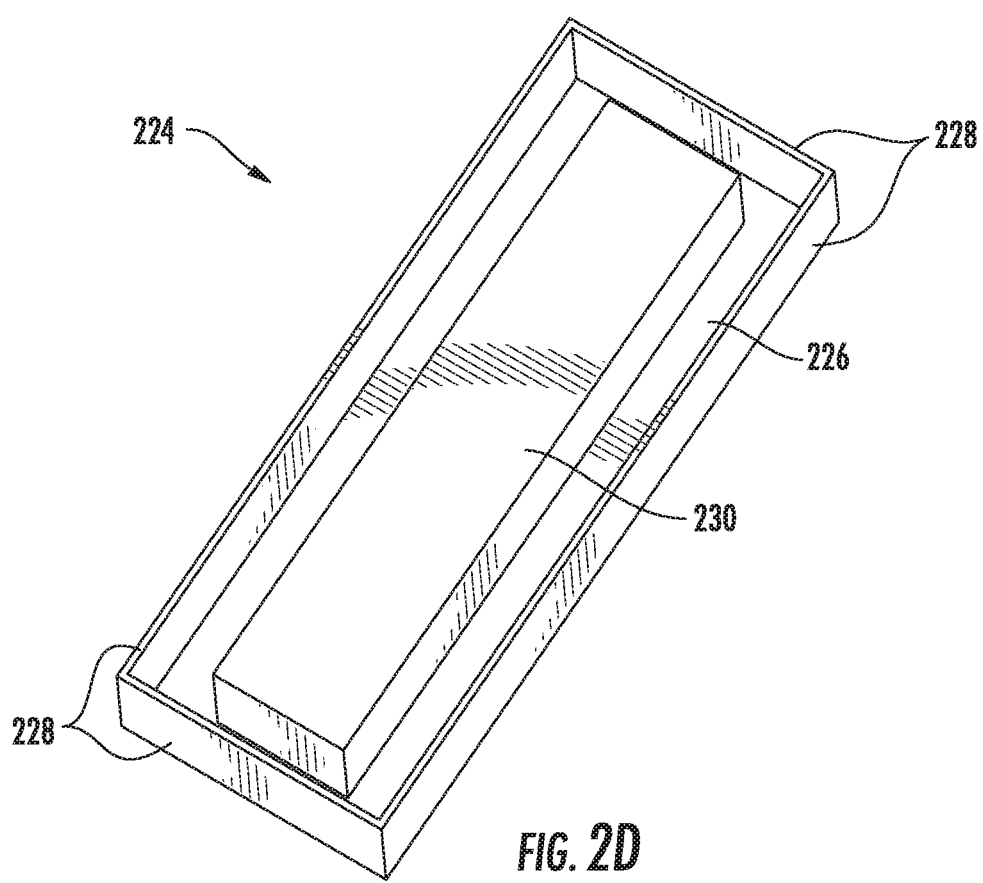
FIG. 2D is perspective view of a mold for producing the body of the tunable electronic unit with the planar inductor of FIG. 2A.

FIG. 2D depicts a mold 224 for the body 202 of the tunable electronic unit 200. The mold includes a bottom wall 226, sidewalls 228 extending along a periphery of the bottom wall 226, and an internal block 230, such that a molding channel is formed between the sidewalls 228 and the internal block 230. The height of the sidewalls 228 is greater than the height of the internal block 230. In certain embodiments, the molding channels may be completed (enclosed) by mounting them onto glass slides or a layer of PDMS. In certain embodiments, these channels may be 70 mm long, 15 mm wide, and 10 mm deep with a wall thickness of 7 mm on the sides and 4 mm at both ends.

Figure 3A:
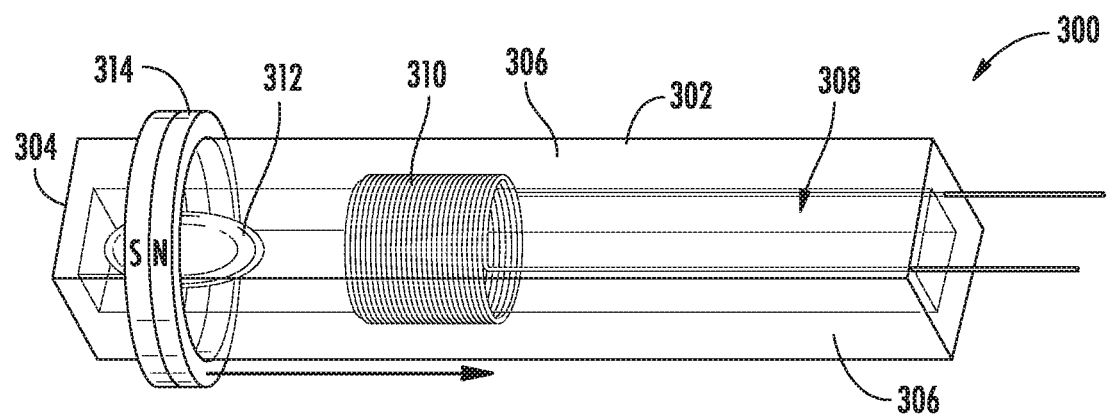
FIG. 3A is a perspective view of an embodiment of the tunable electronic unit of FIGS. 1A-1C incorporating an axial inductor.

FIGS. 3A-3D are views directed to an embodiment of the tunable electronic unit 102 of FIGS. 1A-1C incorporating an axial inductor. Referring to FIG. 3A, the tunable electronic unit 300 includes a body 302 with a bottom wall 304 and sidewalls 306 defining a fluidic channel 308 (e.g., soft fluidic channel), a variable electrical component including an axial inductor 310, a mobile component 312 configured to move within the fluidic channel 308, and a ring magnet 314 (e.g., remote magnet or local magnet) external to the fluidic channel 308. The position of the mobile component 312 relative to the axial inductor 310 affects the inductance of the tunable electronic unit 300. In certain embodiments, the body 302 may have a channel cross section of at least 1 mm×1 mm (e.g., 3 mm×3 mm, 5 mm×5 mm, etc.), and/or a channel length of at least 1 mm (e.g., 10 mm, 20 mm, 40 mm, 60 mm).

The axial inductor 310 is positioned within the sidewalls 306 and external to the fluidic channel 308, with at least a portion of the body 302 being positioned between the axial inductor 310 and the mobile component 312. As illustrated, the ring magnet 314 is positioned around the fluidic channel 308.

In certain embodiments, the ring magnet 314 has poles aligned along a length L of the fluidic channel 308. In certain embodiments, the ring magnet 314 includes NdFeB, Grade N42 with an outer diameter of 19 mm, an inner diameter of 9.5 mm, and a thickness of 3.2 mm.

Figure 3B:
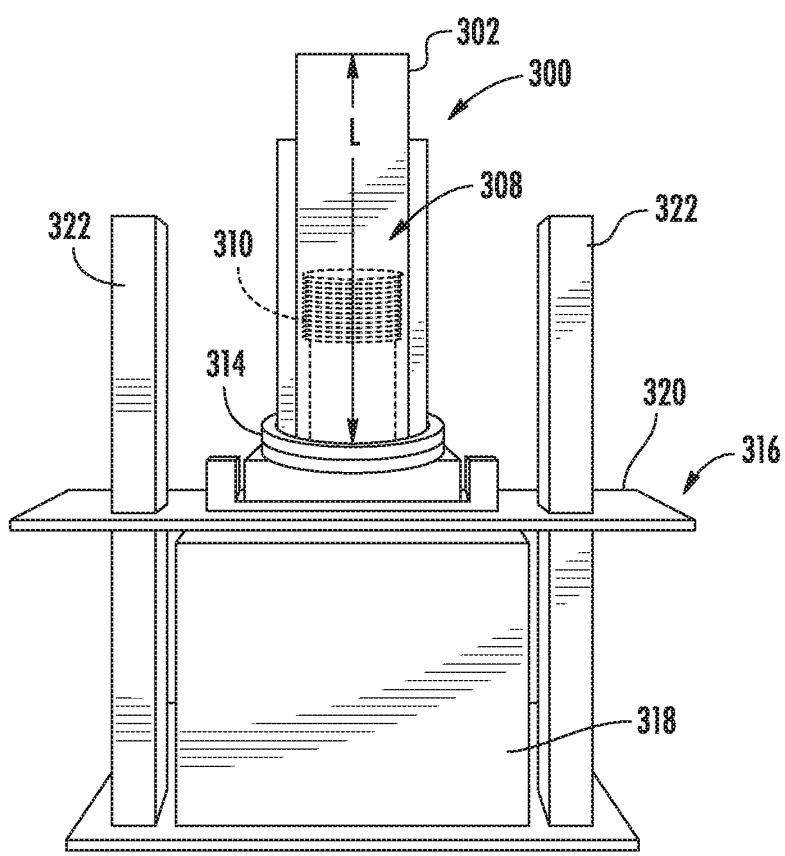
FIG. 3B is a perspective view of an embodiment of the tunable electronic unit with the axial inductor of FIG. 3A attached to a mounting platform.

FIG. 3B is a view of an embodiment of the tunable electronic unit 300 with the axial inductor 310 of FIG. 3A attached to a mounting platform 316. The mounting platform 316 includes a base 318 and a slider 320 movable relative to the base 318. The slider 320 is mounted in position by posts 322 of the base 318. The ring magnet 314 is attached to a top of the slider 320 and moves relative to the length L of the fluidic channel 308 of the body 302.

Figure 3C:
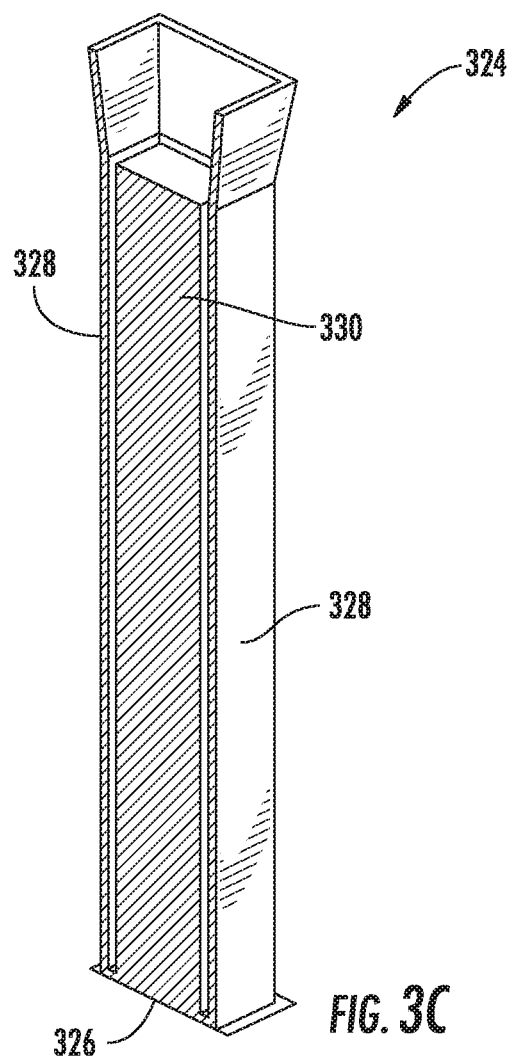
FIG. 3C is a perspective view of a mold for the body of the tunable electronic unit with the axial inductor of FIG. 3A.

FIG. 3C depicts a mold 324 for the body 302 of the tunable electronic unit 300. The mold includes a bottom wall 326, sidewalls 328 extending along a periphery of the bottom wall 326, and an internal block 330, such that a molding channel is formed between the sidewalls 328 and the internal block 330. The height of the sidewalls 328 is greater than the height of the internal block 330. In certain embodiments, these channels may be 70 mm long, 15 mm wide, and 10 mm deep with a wall thickness of 7 mm on the sides and 4 mm at both ends.

Figure 3D:
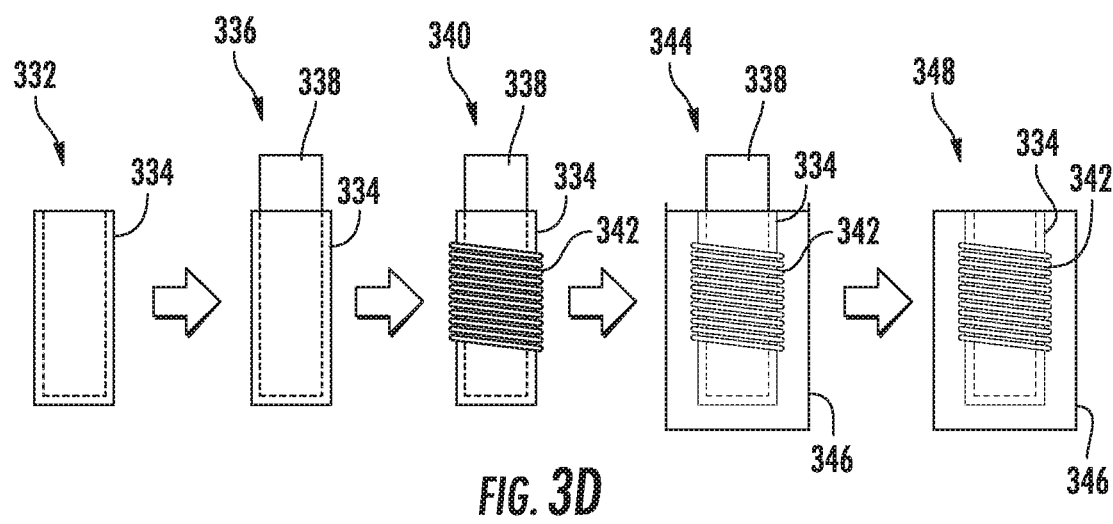
FIG. 3D includes five frames schematically illustrating fabrication of the tunable electronic unit of FIG. 3A.

FIG. 3D includes five frames schematically illustrating fabrication of the tunable electronic unit with the axial inductor of FIG. 3A. In a first step 332, reinforced inner walls 334 (e.g., 0.5 mm thickness) are fabricated, such as by using PDMS (e.g., using the mold of FIG. 3C). In a second step 336, a 3D printed cubic core 338 is placed inside the reinforced inner walls 334 for reinforcement and prevention of any deformations during wire winding. In a third step 340, a wire 342 (e.g., 28 gauge copper wire) is wound around the reinforced inner walls 334 (e.g., over a length of 5 mm). In a fourth step 344, the reinforced inner walls 334 and the wire 342 (which may also be referred to as a coil) go through another casting process (e.g., PDMS casting) to add outer walls 346 (e.g., 2 mm thickness) to the reinforced inner walls 334 and encase the wire 342. In a fifth step 348, the 3D printed cubic core 338 is removed. The outer walls 346 prevent deformation of the reinforced inner walls 334 during use and the reinforced inner walls 334 are thin enough to house the wire 342 sufficiently close to the inner surface of the reinforced inner walls 334.

Figure 4A:
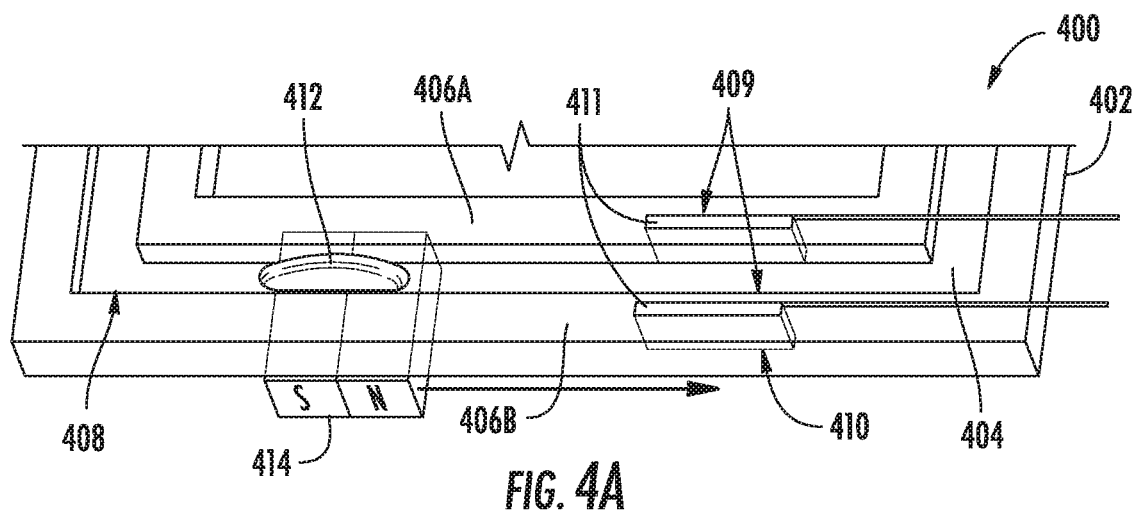
FIG. 4A is a perspective view of an embodiment of the tunable electronic unit of FIGS. 1A-1C incorporating a capacitor.

FIGS. 4A-4D are views directed to an embodiment of the tunable electronic unit 102 of FIGS. 1A-1C incorporating a capacitor. Referring to FIG. 4A, the tunable electronic unit 400 includes a body 402 with a bottom wall 404, inner sidewalls 406A and outer sidewalls 406B defining a fluidic channel 408 (e.g., soft fluidic channel), a variable electrical component including a capacitor 410, a mobile component 412 configured to move within the fluidic channel 408, and a magnet 414 (e.g., remote magnet or local magnet) external to the fluidic channel 408. The capacitor 410 includes charge accumulation elements positioned on opposite sides of the fluidic channel 408. The position of the mobile component 412 relative to the capacitor 410 affects the capacitance of the tunable electronic unit 400.

In certain embodiments, the fluidic channel 408 is 1.5 mm wide, 5 mm deep, and 152 mm long (the total loop length). In certain embodiments, two slot gaps 409 of 10 mm×7 mm may be embedded on each side of the fluidic channel 408. In certain embodiments, the two slot gaps 409 are separated by a distance of 2.5 mm. In certain embodiments, the capacitor 410 may be made of 10 mm×7 mm copper plates 411 embedded in the slot gaps 409. In certain embodiments, at least a portion of the body 402 is positioned between the capacitor 410 and the mobile component 412.

In certain embodiments, the magnet 414 includes a block magnet with poles aligned along a length L of the fluidic channel 408. In certain embodiments, the magnet 414 includes NdFeB, Grade N42 with dimensions of 19 mm×9.5 mm×6.35 mm.

Figure 4B:
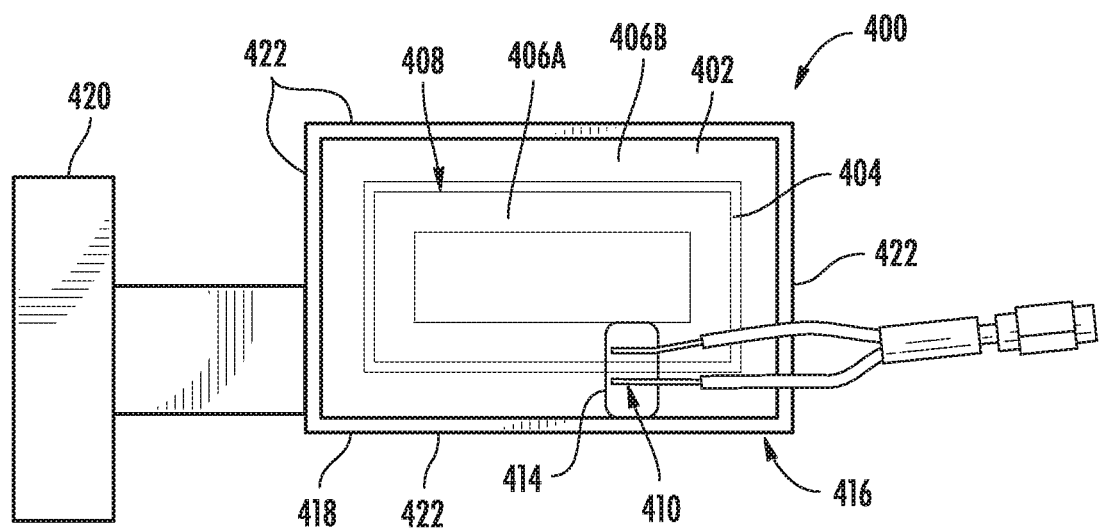
FIG. 4B is a top plan view of an embodiment of the tunable electronic unit with the capacitor of FIG. 4A attached to a mounting platform.

FIG. 4B is a view of an embodiment of the tunable electronic unit 400 with the capacitor 410 of FIG. 4A attached to a mounting platform 416. The mounting platform 416 includes a base 418 and a slider 420 movable relative to the base 418. The body 402 is mounted in position within sidewalls 422 of the base 418. The magnet 414 is attached to the slider 420 and moves relative to the length L of the fluidic channel 408 of the body 402.

Figure 4C:
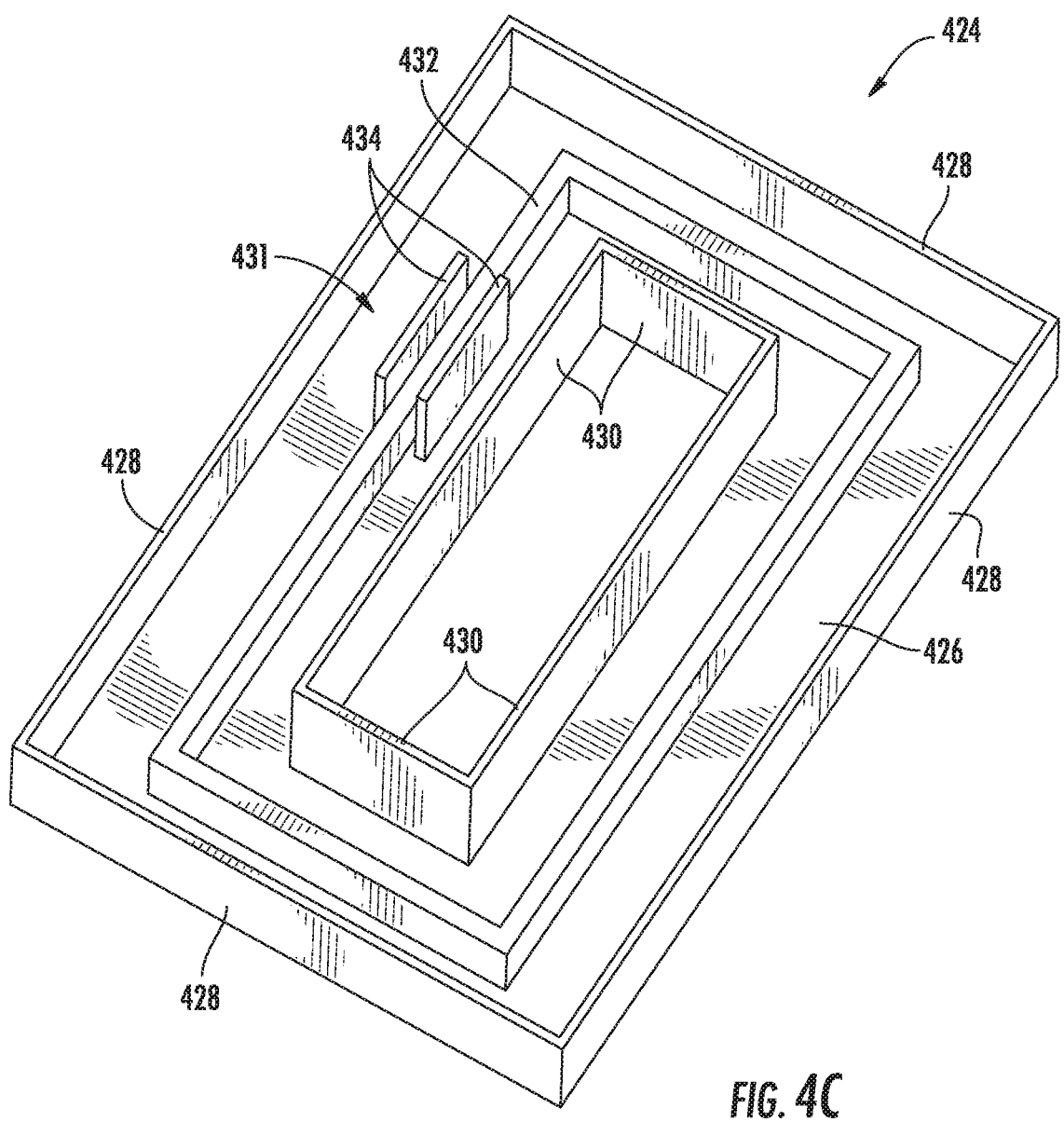
FIG. 4C is a perspective view of a mold for the body of the tunable electronic unit with the capacitor of FIG. 4A.

FIG. 4C depicts a mold 424 for the body 402 of the tunable electronic unit 400. The mold includes a bottom wall 426, outer sidewalls 428 extending along a periphery of the bottom wall 426, and internal sidewalls 430, such that a molding channel 431 is formed between the outer sidewalls 428 and the internal sidewalls 430. The mold 424 further includes a block 432 between the outer sidewalls 428 and the internal sidewalls 430 to form the fluidic channel 408. The mold 424 further includes tabs 434 positioned on opposite sides of the block 432 to form the slot gaps 409. In certain embodiments, the molding channels may be completed (enclosed) by mounting them onto glass slides or a layer of PDMS.

Figure 5A:
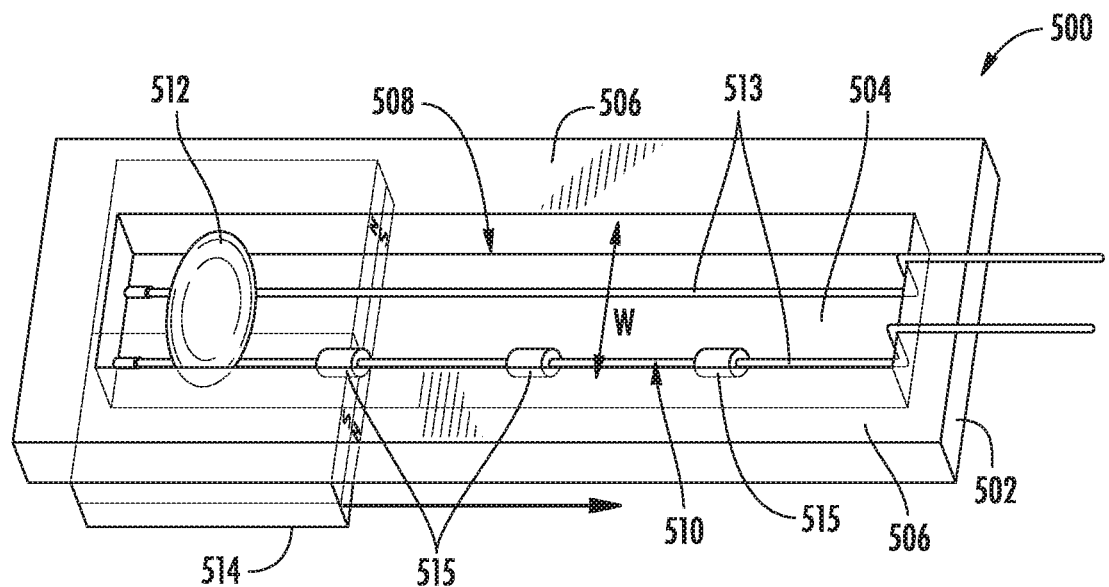
FIG. 5A is a perspective view of an embodiment of the tunable electronic unit of FIG. 1A incorporating a resistor.

FIGS. 5A-5D are views directed to an embodiment of the tunable electronic unit 102 of FIGS. 1A-1C incorporating a variable resistor. Referring to FIG. 5A, the tunable electronic unit 500 includes a body 502 with a bottom wall 504 and sidewalls 506 defining a fluidic channel 508 (e.g., soft fluidic channel), a variable electrical component including a variable resistor 510, a mobile component 512 configured to move within the fluidic channel 508, and a magnet 514 (e.g., remote magnet or local magnet) external to the fluidic channel 508. The variable resistor 510 is positioned within the fluidic channel 508, where the variable resistor 510 is in contact with the mobile component 512. The position of the mobile component 512 relative to the variable resistor 510 affects the resistance and/or impedance of the tunable electronic unit 500.

In certain embodiments, the magnet 514 includes a block magnet with poles aligned along a width W of the fluidic channel 508. In certain embodiments, the magnet 514 includes two NdFeB, Grade N42 material magnets with dimensions of 19 mm×9.5 mm×6.35 mm.

In certain embodiments, the variable resistor 510 may include two parallel wires 513. In certain embodiments, at least one of the parallel wires 513 interconnects a series of resistors 515. In certain embodiments, one of the parallel wires 513 includes a high resistance wire. In certain embodiments, one of the parallel wires 513 includes variable resistance (e.g., gradient resistance) along its length. The mobile component 512 moves over both parallel wires 513 and connects them to make a closed circuit. Moving the mobile component back and forth on the parallel wires 513 changes the resistance as different number of resistors 515 can be included in the circuit. In certain embodiments, one of the parallel wires 513 is a 26 gauge copper wire used for connecting the series of resistors 515, and the other of the parallel wires 513 is 22 gauge. Three 3300 surface-mounted device (SMD) resistors with 20 mm distance from each other may be embedded in the unit. To obtain a continuous change in resistance, one of the parallel wires 513 or resistors 515 may be replaced with a high resistance material.

Figure 5B:
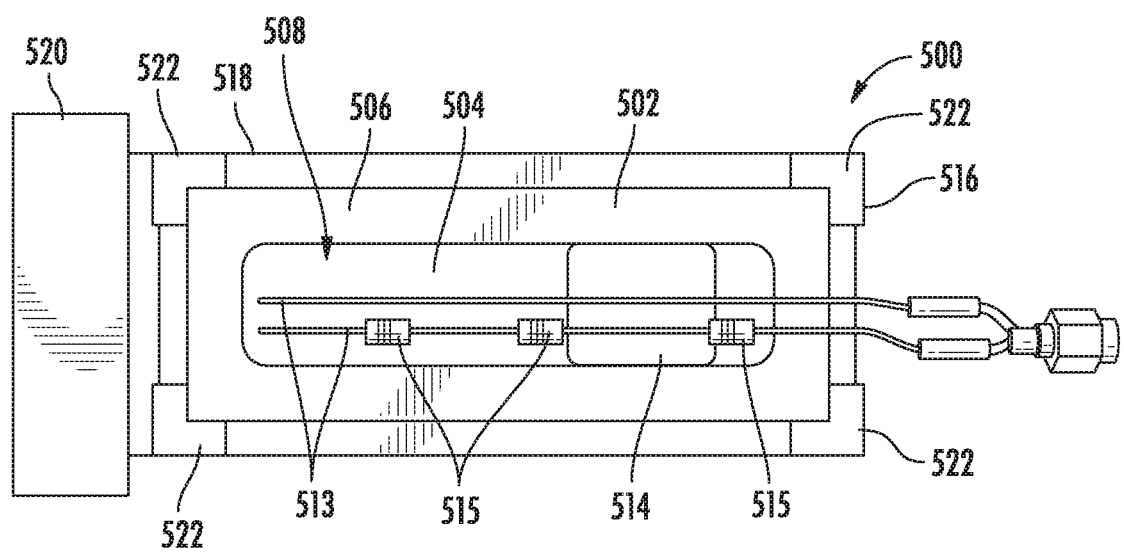
FIG. 5B is a top plan view of an embodiment of the tunable electronic unit with the resistor of FIG. 5A attached to a mounting platform.

FIG. 5B is a view of an embodiment of the tunable electronic unit 500 with the resistor 506 of FIG. 5A attached to a mounting platform 516. The mounting platform 516 includes a base 518 and a slider 520 movable relative to the base 518. The body 502 is mounted in position by posts 522 of the base 518. The magnet 514 is attached to the slider 520 and moves relative to the length L of the fluidic channel 508 of the body 502.

FIG. 5C depicts a mold 524 for the body 502 of the tunable electronic unit 500. The mold includes a bottom wall 526, sidewalls 528 extending along a periphery of the bottom wall 526, and an internal block 530, such that a molding channel is formed between the sidewalls 528 and the internal block 530. The height of the sidewalls 528 is greater than the height of the internal block 530. In certain embodiments, the molding channels may be completed (enclosed) by mounting them onto glass slides or a layer of PDMS. In certain embodiments, these channels may be 70 mm long, 15 mm wide, and 10 mm deep with a wall thickness of 7 mm on the sides and 4 mm at both ends.

Figure 6:
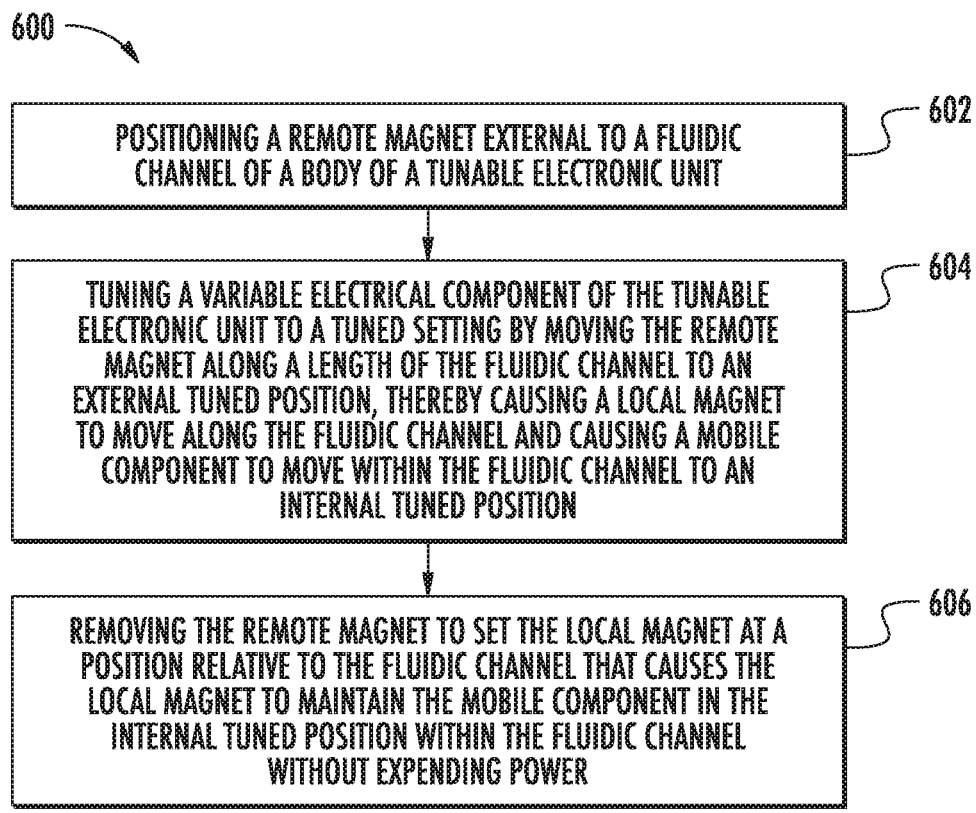
FIG. 6 is a flowchart illustrating a method for tuning a tunable electronic unit.

FIG. 6 is a flowchart 600 illustrating a method for tuning a tunable electronic unit. Step 602 includes positioning a remote magnet external to a fluidic channel of a body of a tunable electronic unit, with the remote magnet being external to and separate from the tunable electronic unit.

Step 604 includes tuning a variable electrical component of the tunable electronic unit to a tuned setting by moving the remote magnet along a length of the fluidic channel to an external tuned position, thereby causing a local magnet to move along the fluidic channel and causing a mobile component to move within the fluidic channel to an internal tuned position. The remote magnet causes movement of the mobile component either directly or indirectly via the local magnet. Moving the remote magnet along a length of the fluidic channel causes movement of the local magnet external to the fluidic channel with at least a portion of the body positioned between the local magnet and the mobile component. In other words, moving the local magnet along a length of the fluidic channel to a tuned position causes movement (directly or indirectly) of the mobile component within the fluidic channel to the internal tuned position, where the local magnet is moved using the remote magnet.

Step 606 includes removing the remote magnet to set the local magnet at a position relative to the fluidic channel that causes the local magnet to maintain the mobile component in the internal tuned position within the fluidic channel without expending power.

In certain embodiments, the method includes maintaining the external tuned position of the remote magnet (e.g., in a position magnetically coupled with the local magnet) in order to maintain the tuned setting of the tunable electronic unit without expending power. In certain embodiments, the method includes only the remote magnet without use of the local magnet. Without the local magnet, the remote magnet directly causes movement of the mobile component. Wherein without the local magnet, the remote magnet must stay in the external tuned position to maintain the mobile component in the internal tuned position. It is noted that in certain embodiments without the local magnet, the remote magnet would have a configuration (e.g., orientation of magnetic poles) as similarly discussed above regarding the local magnet.

FIGS. 7A-7H provide data and charts relating to a series of experiments and measurements illustrating use of the soft electronics components and variations thereof. These experiments are merely illustrative of the features of the tunable electronic unit disclosed herein. A vector network analyzer (VNA) may be used, for example, to measure the effect of the mobile component on inductance, quality-factor (Q-factor), and self-resonance frequency (SRF) of the inductors, capacitance, Q-factor, and SRF of capacitors, and impedance of the resistors.

Figures 7A, 7B:
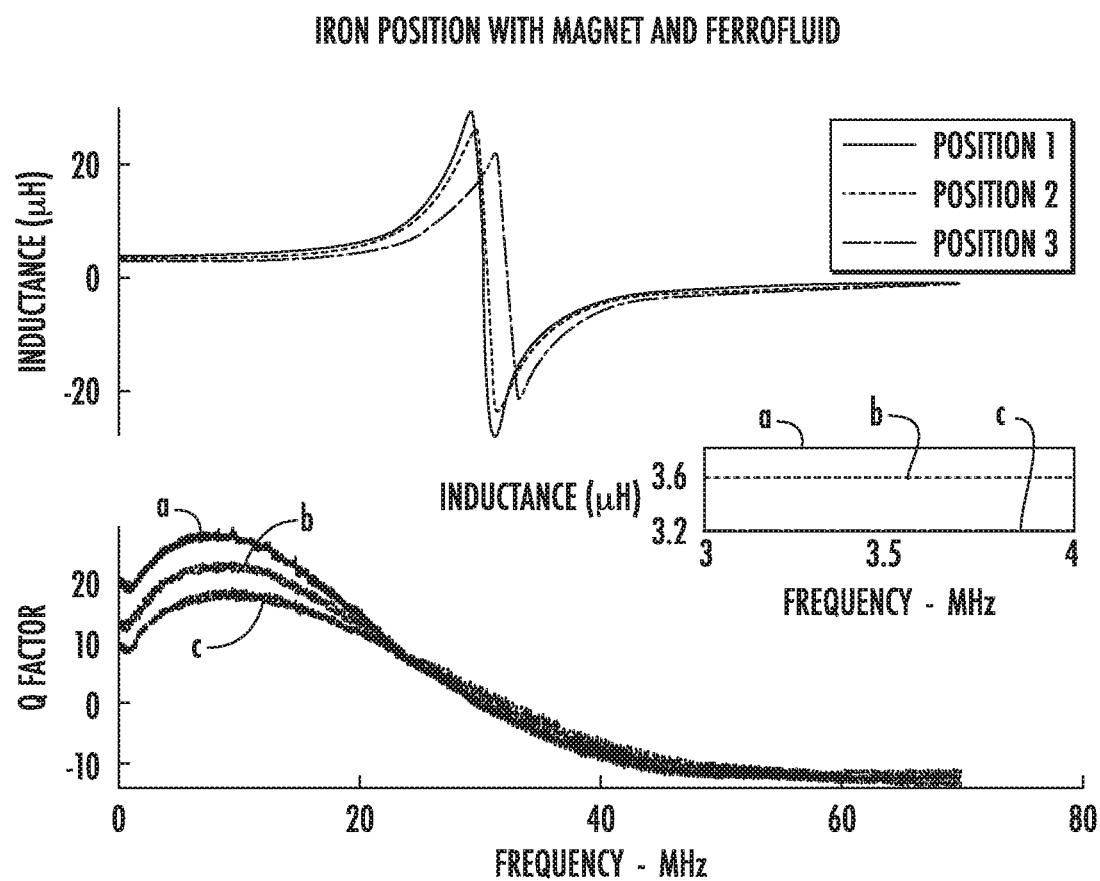
FIG. 7A is a table illustrating results of different positions and quantities of the mobile components for the tunable electronic unit with the planar inductor of FIG. 2A.
FIG. 7B is a chart illustrating a tuning range change for the tunable electronic unit with the planar inductor of FIG. 2A.

FIGS. 7A-7B are directed to experiments and measurements directed to the tunable electronic unit with the planar inductor. FIG. 7A is a table illustrating results of different positions and quantities of the mobile components for the tunable electronic unit with the planar inductor of FIG. 2A. The inductances were measured at a frequency of 10 MHz and Q-factors at the peak. Minimum, maximum, and the standard error of the mean were calculated based on data collected from three planar inductors with the same design.

The inductances are in pH and the self-resonance frequencies are in MHz. For the quantity-effect measurements, the mobile component was placed at the center of the planar inductors. Quantity-effect experiments include cases (1)-(4), including: (1) changing the mass of iron without the magnet being present, (2) changing the mass of iron with the magnet being present, (3) changing the mass of iron with the magnet and ferrofluid being present, and (4) changing the volume of ferrofluid with the magnet being present. For the position-effect measurements, the mobile component was moved to three different positions including: (1) the center of the electrical component, (2) the edge of the electrical component, and (3) 50 mm from the center of the electrical component. Position-effect experiments include cases (5)-(9) including: (5) moving iron without the magnet being present, (6) iron with the magnet being present, (7) a mixture of iron and ferrofluid with the magnet being present, (8) ferrofluid with the magnet being present, and (9) only the magnet being present.

Moving the mobile component results in more significant changes in inductance than changing its quantity. Of the quantity-effect experiments, case (3) produced the greatest tuning range of inductance (2.9%), and of the position-effect experiments, case (7) achieved the broadest tuning range for inductance (20.9%). Change in inductance at a plurality of positions of the magnet, and the change in Q factor at a plurality of inductances are plotted over the frequency range of 0.3-70 MHz in FIG. 7B. The Q-factor relates the stored energy in the inductor to the dissipated energy, which is typically defined as the ratio of the reactance value to the equivalent resistance value at a given frequency, using a narrow-band approximation approach. An increase in the inductance results in an increase in stored energy, and thus an increase in Q-factor. In quantity-effect experiments, the maximum Q-factor change is 8.5% [case (2)] and in position-effect experiments, the maximum 0-factor change is 39% [case (7)]. SRF is also affected by changing either the position or quantity of the mobile components. SRF of an inductor is inversely proportional to the value of the inductance; therefore, a decrease in SRF is expected from an increase in the inductance value of the component. The quantity of the mobile component has a minimal impact on SRF (less than 4%), while its position change results in shifting the SRF more significantly [7.3% for case (9) and 9.4% for case (8)].

Figures 7C, 7D:
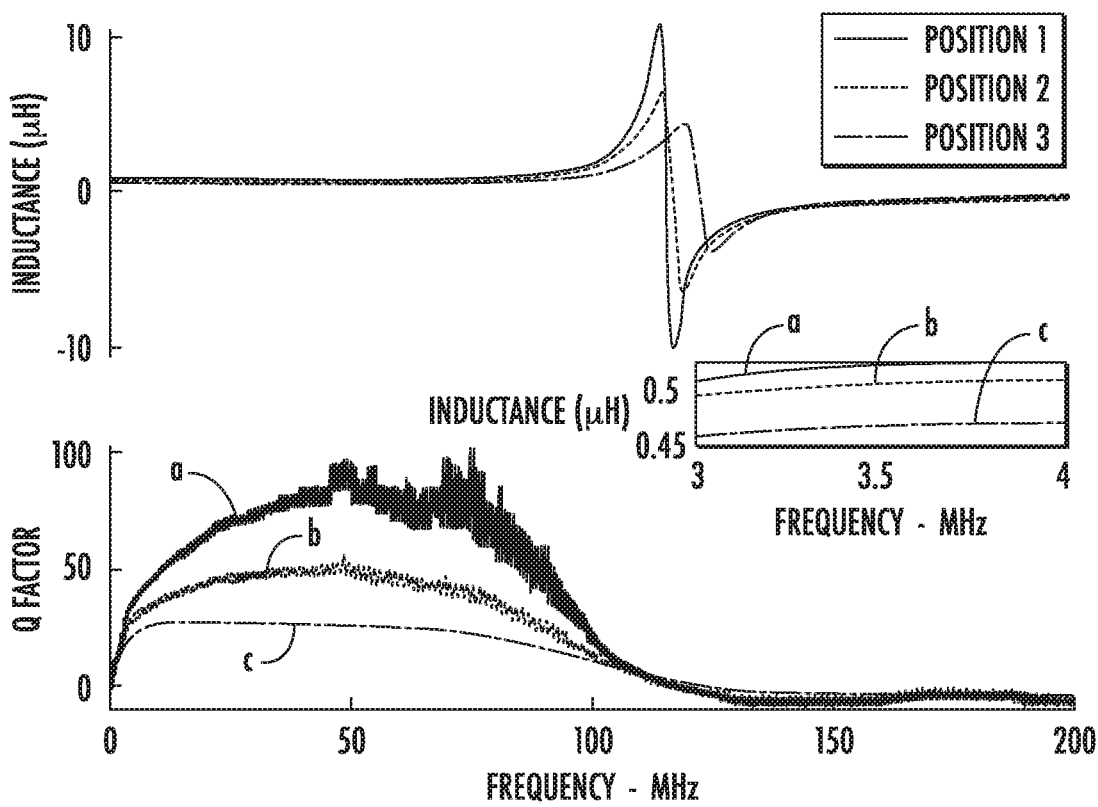
FIG. 7C is a table illustrating results of different positions and quantities of the mobile components for the tunable electronic unit with the axial inductor of FIG. 3A.
FIG. 7D is a chart illustrating a tuning range change for the tunable electronic unit with the axial inductor of FIG. 3A.

FIGS. 7C-7D are directed to experiments and measurements directed to the tunable electronic unit with the axial inductor. FIG. 7C is a table illustrating results of different positions and quantities of the mobile components for the tunable electronic unit with the axial inductor of FIG. 3A. The inductance is measured at a frequency of 1.5 MHz and the Q-factor at the peak. Minimum, maximum, and the standard error of the mean are calculated based on data collected from three different axial inductors of cross section 3 mm×3 mm with the same design. The inductances are in pH and the self-resonance frequencies are in MHz. For the quantity-effect measurements, the mobile component was placed inside the axial inductors. Quantity-effect experiments include cases (1)-(4), including: (1) changing the mass of iron without the magnet being present, (2) changing the mass of iron with the magnet being present, (3) changing the mass of iron with the magnet and ferrofluid being present, and (4) changing the volume of ferrofluid with the magnet being present. For the position-effect measurements, the mobile component was moved to three different positions including: (1) inside the electrical component, (2) the edge of the electrical component, and (3) 15 mm from the center of the electrical component. Position-effect experiments include cases (5)-(9) including: (5) moving iron without the magnet being present, (6) iron with the magnet being present, (7) a mixture of iron and ferrofluid with the magnet being present, (8) ferrofluid with the magnet being present, and (9) only the magnet being present.

Moving the mobile component results in more significant changes in inductance than changing its quantity. Of the quantity-effect experiments, case (4) produced the greatest tuning range of inductance (increase of 16.33%), and of the position-effect experiments, case (7) achieved the broadest tuning range for inductance (increase of 23%). Change in inductance at a plurality of positions of the magnet, and the change in Q factor at a plurality of inductances are plotted over the frequency range of 0.3-200 MHz in FIG. 7D. In quantity-effect experiments, the maximum Q-factor change is 99% in case (2) and in position-effect experiments, the maximum Q-factor change is 119% in case (7). Case (4) induced the greatest shift in SRF among quantity-effect experiments (8.46%) and among position-effect experiments, case (7) shifts the SRF more significantly (9.36%).

The changes in characteristics of the planar and axial inductors under the position and quantity effects are due to the relation of inductance and the magnetic permeability of the material in proximity to the inductor. The increase in permeability is due to the introduction and incremental addition of iron particles and ferrofluid (ferromagnetic materials) to the inductor, both having relative permeability greater than one. By increasing the amount of iron particles or ferrofluid, the effect on the inductance is increased. Moving the mobile component to the core of the inductors causes the maximum effect. The differences in the level of effectiveness between cases using iron particles [case (1)-(3) and (5)-(7)] and cases using ferrofluid [cases (4) and (8)] are due to the lower concentration of ferrite particles in the ferrofluid. In case (9), bringing the magnet close to the inductor disrupts its magnetic field lines and changes the permeability of space proximal to the inductor, which alters the unit's inductance.

Figures 7E, 7F:
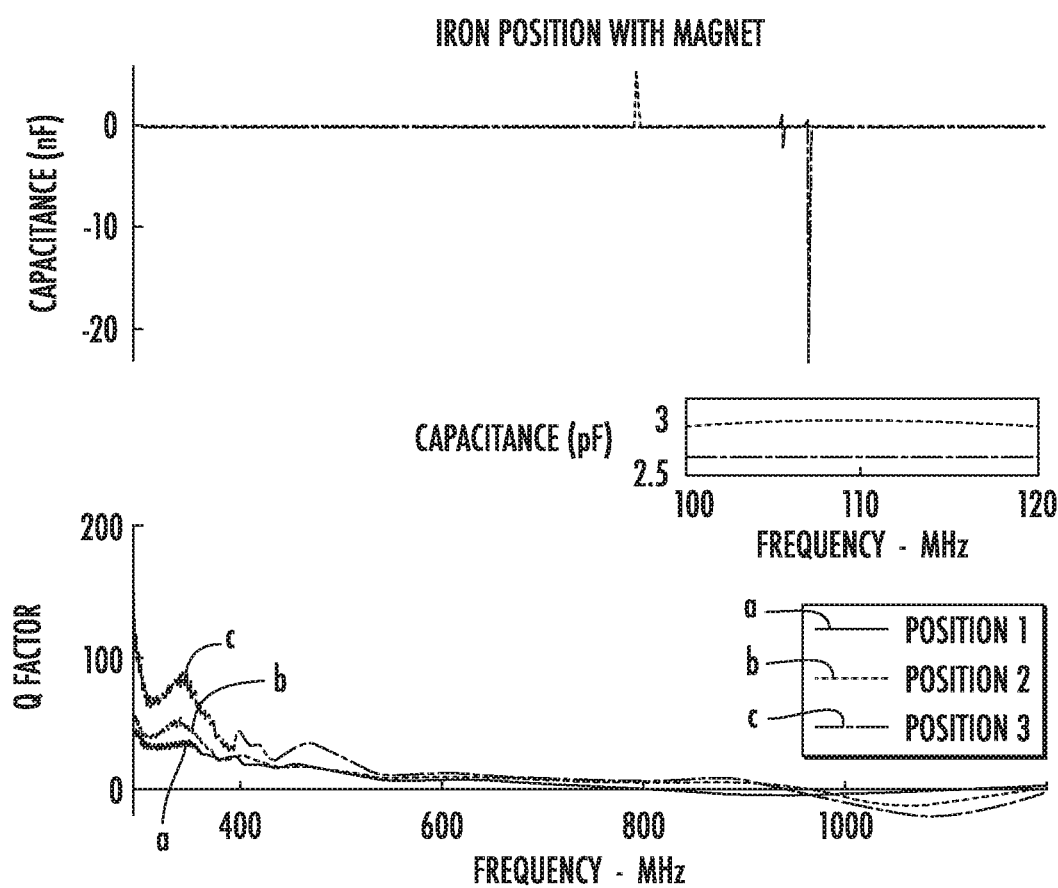
FIG. 7E is a table illustrating results of different positions and quantities of the mobile components for the tunable electronic unit with the capacitor of FIG. 4A.
FIG. 7F is a chart illustrating a tuning range change for the tunable electronic unit with the capacitor of FIG. 4A.

FIGS. 7E-7F are directed to experiments and measurements directed to the tunable electronic unit with the capacitor. FIG. 7E is a table illustrating results of different positions and quantities of the mobile components for the tunable electronic unit with the capacitor of FIG. 4A. The capacitances and Q-factors are measured at a frequency of 243 MHz. Minimum, maximum, and the standard error of the mean are calculated based on data collected from three different capacitors with the same design. The capacitances are in pF and the self-resonance frequencies are in MHz. For the quantity-effect measurements, the mobile component was placed between the plates for the capacitors. Quantity-effect experiments include cases (1)-(4), including: (1) changing the mass of iron without the magnet being present, (2) changing the mass of iron with the magnet being present, (3) changing the mass of iron with the magnet and ferrofluid being present, and (4) changing the volume of ferrofluid with the magnet being present. For the position-effect measurements, the mobile component was moved to three different positions including: (1) between the plates of electrical component, (2) the edge of those plates, and (3) 20 mm from the center of those plates. Position-effect experiments include cases (5)-(9) including: (5) moving iron without the magnet being present, (6) iron with the magnet being present, (7) a mixture of iron and ferrofluid with the magnet being present, (8) ferrofluid with the magnet being present, and (9) only the magnet being present.

Moving the mobile component results in more significant tunability of capacitance than changing its quantity. Of the position-effect experiments, case (6) produced the greatest tuning range of capacitance (increase of 12.7%), and of the quantity-effect experiments, case (2) was the most effective scenario for tuning of capacitance (increase of 6.5%). Capacitance and Q-factor of case (6) are plotted over the frequency range of 0.3-1200 MHz in FIG. 7F.

In cases (1)-(3) and (5)-(7), iron particles conglomerated inside the channels near the magnet, resulting in a conductive clustered medium. Considering the thin layer of PDMS between the clustered iron particle medium and each plate, this electronic unit can be conceptualized as two capacitors in series. The total capacitance decreases as the conductive medium grows larger in area. This increase in area is facilitated by either changing the amount of iron particles between the capacitor electrodes through adding more iron particles [cases (1)-(3)] or moving the mobile component further toward the center of the capacitor's plates [cases (5)-(7)]. This effect is more significant in the presence of the magnet in cases (2) and (6), as the iron particles under the influence of the magnetic field are more closely forced together between the capacitor plates. This increases the amount of mobile component material between the plates, leaving fewer and smaller air gaps in the conductive cluster in comparison to cases (1) and (5). In cases (3) and (7), using ferrofluid along with iron particles showed counter effects or only moderate changes, where the variations in capacitance were smaller in these cases compared to cases (2) and (6), in which ferrofluid was not used. Small effects on capacitance seen in cases (4) and (8) are due to the small dielectric permittivity of ferrofluid, which is close to that of air. Maximum Q-factor change in quantity-effect studies is 36.6% in case (2). Of position-effect experiments, the maximum Q-factor change was 53% in case (8). For capacitors, the changes in Q-factor are due to changes in the ratio of stored to dissipated energy. In cases (5)-(7), moving the iron particles between the plates resulted in a decrease in the capacitance and thus, an increase in the Q-factor. This relation is not linear, as iron particles introduce conduction losses that decrease the Q-factor. In cases (3)-(4) and (7)-(8), ferrofluid acted as a dielectric and introduced dielectric loss. Therefore, the net change in the Q-factor was subdued.

The change in the amount of the mobile component has only a slight effect on the SRF (less than 9%) while the position of the mobile component causes a more significant shift in the SRF (up to 16%). SRF of capacitors is inversely proportional to the value of the capacitance. Because the capacitance experiences bigger changes during position-effect experiments, SRF will undergo a more significant shift as well.

Figures 7G, 7H:
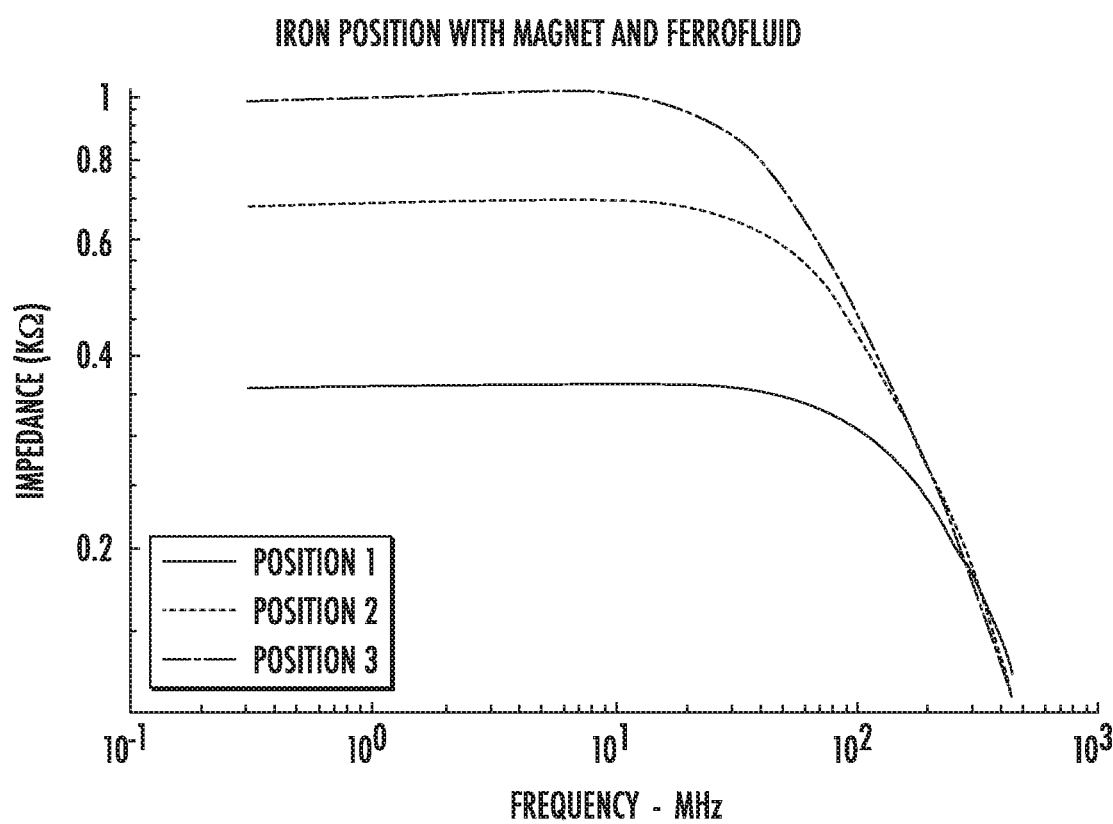
FIG. 7G is a table illustrating results of different positions and quantities of the mobile components for the tunable electronic unit with the resistor of FIG. 5A.
FIG. 7H is a chart illustrating a tuning range change for the tunable electronic unit with the resistor of FIG. 5A.

FIGS. 7G-7H are directed to experiments and measurements directed to the tunable electronic unit with the resistor. FIG. 7G is a table illustrating results of different positions and quantities of the mobile components for the tunable electronic unit with the resistor of FIG. 5A. The impedances are measured at a frequency of 692 kHz. Minimum, maximum, and the standard error of the mean are calculated based on the data collected from three different resistors. The impedances are in kΩ. For the quantity-effect measurements, the mobile component was placed between the first and the second SMD resistors. Quantity-effect experiments include cases (1) and (2), including: (1) changing the mass of iron without the magnet being present, and (2) changing the volume of ferrofluid mixed with iron particles with the magnet being present. For the position-effect measurements, the mobile component was moved to three different positions. For resistor units, the three different positions of the mobile component correspond to having one, two, or three SMD resistors in the circuit. Position-effect experiments include cases (3) and (4), including: (3) changing the position of iron particles with the magnet, and (4) changing the position of iron particles mixed with ferrofluid using a magnet.

The impedance of the resistors is measured at 692 kHz. The iron amount [case (1)] had more influence on the conductivity of the mobile component than ferrofluid volume [case (2)]. Furthermore, in the position-effect experiments, the resistance of mobile component in case (4) was less than case (3). FIG. 7H is a chart illustrating a turning range change for the tunable electronic unit with the resistor of FIG. 5A. Case (4) offers the broadest tuning range for impedance among the resistors evaluated in this study.

The circuit is open when using the mobile component comprised of iron powder without a magnet, as the resistance is too high regardless of the iron mass. The ferrofluid used in these experiments is not electrically conductive. The resistance of the mobile component drops when adding more iron powder under the influence of the magnet. This is due to the alignment of iron particles along the magnetic field direction of two magnets, which bridges two wires and connects the circuit. By increasing the amount of iron, the surface area of the mobile component connecting the two wires increases, which leads to a better conductivity. Adding ferrofluid improves the conductivity of the mobile component. The change in the impedance by moving the mobile component in different positions is due to different numbers of resistors being included in the circuit. Adding ferrofluid to the mobile component can improve the result of the position slightly.

The inductance of planar inductors can change up to 20.9% from 3.31 µH by using a mixture of iron and ferrofluid as the mobile component with the magnet being present, the inductance of axial inductors can change up to 23% from 0.44 µH by utilizing a mixture of iron and ferrofluid as the mobile component with the magnet being present, the capacitance of capacitors can change up to 12.7% from 2.854 pF under the influence of iron particles as the mobile component with the magnet being present, and impedance of resistors can change up to 185.3% from 0.353 kΩ by moving the mobile component made of iron particles. In addition, it is shown that the Q-factor of planar inductors changes up to 39% from 19.1, the Q-factor of axial inductors changes up to 119% from 27.3, and the Q-factor of capacitors changes up to 53% from 15.5. The changes in the inductance, capacitance, and resistance follow "quasi-linear profiles" with the input during position and quantity effect experiments. This means that the mobile component can be encapsulated inside the channel and actuated remotely to tune the characteristics of an electronic unit. Moreover, the possibility of using different mixing ratios of iron particles and ferrofluid can provide different tuning ranges and thus different tuning resolutions for the same displacement of the mobile component. This technique can be used for developing tunable electronics with wide tuning ranges (e.g., filters, receivers, and transmitters) for a variety of applications.

Those skilled in the art will recognize improvements and modifications to the preferred embodiments of the present disclosure. All such improvements and modifications are considered within the scope of the concepts disclosed herein and the claims that follow.

What is claimed is:

1. A tunable electronic unit, comprising:
a body defining a fluidic channel;
at least one mobile component configured to move within the fluidic channel responsive to movement of at least one magnet external to the fluidic channel, wherein the at least one magnet is external to and separate from the tunable electronic unit; and
at least one variable electrical component;
wherein the at least one variable electrical component is configured to be tuned to a tuned setting depending on a position of the at least one mobile component within the fluidic channel.

2. The tunable electronic unit of claim 1, wherein the tunable electronic unit is flexible.

3. The tunable electronic unit of claim 1, wherein the at least one variable electrical component is maintained at the tuned setting without expending power by maintenance of the position of the at least one mobile component within the fluidic channel.

4. The tunable electronic unit of claim 1, wherein the at least one variable electrical component comprises a resistor positioned within the fluidic channel.

5. The tunable electronic unit of claim 4, wherein the at least one magnet comprises at least one block magnet with poles aligned along a width of the fluidic channel.

6. The tunable electronic unit of claim 1, wherein the at least one variable electrical component comprises a capacitor including charge accumulation elements positioned on opposing sides of the fluidic channel.

7. The tunable electronic unit of claim 6, wherein the at least one magnet comprises a block magnet with poles aligned along a length of the fluidic channel.

8. The tunable electronic unit of claim 1, wherein the at least one variable electrical component comprises a planar inductor positioned external to the fluidic channel, wherein at least a portion of the body is positioned between the planar inductor and the at least one mobile component.

9. The tunable electronic unit of claim 8, wherein the at least one magnet comprises a block magnet with poles aligned along a length of the fluidic channel.

10. The tunable electronic unit of claim 1, wherein the at least one variable electrical component comprises an axial inductor positioned external to the fluidic channel, wherein at least a portion of the body is positioned between the axial inductor and the at least one mobile component.

11. The tunable electronic unit of claim 10, wherein the at least one magnet comprises a ring magnet positioned around the fluidic channel.

12. The tunable electronic unit of claim 1, wherein the at least one variable electrical component comprises a resistor, a capacitor, and an inductor.

13. The tunable electronic unit of claim 1, wherein the at least one mobile component comprises at least one of an iron powder or a ferrofluid.

14. The tunable electronic unit of claim 1,
further comprising a local magnet external to the fluidic channel with at least a portion of the body positioned between the local magnet and the at least one mobile component;
wherein the local magnet is configured to move responsive to at least one remote magnet.

15. A tunable electronic system, comprising:
the tunable electronic unit of claim 1; and
wherein the at least one magnet comprises an electromagnetic coil system.

16. A method for tuning a tunable electronic unit according to claim 1, the method comprising:
positioning at least one magnet external to the fluidic channel defined in the body of tunable electronic unit, wherein the at least one magnet is separate from the tunable electronic unit; and
tuning the at least one variable electrical component of the tunable electronic unit to a tuned setting by moving the at least one magnet along a length of the fluidic channel to an external tuned position, thereby causing the at least one mobile component to move within the fluidic channel to an internal tuned position.

17. The method of claim 16, wherein:
the tunable electronic unit is flexible;
the at least one variable electrical component comprises at least one of a capacitor, an inductor, or a resistor; and
the at least one mobile component comprises at least one of iron powder or a ferrofluid.

18. The method of claim 16, further comprising maintaining the external tuned position of the at least one magnet to maintain the tuned setting of the tunable electronic unit without expending power.

19. The method of claim 16,
wherein the at least one magnet comprises at least one remote magnet; and
wherein moving the at least one remote magnet along a length of the fluidic channel causes movement of a local magnet external to the fluidic channel with at least a portion of the body positioned between the local magnet and the at least one mobile component.

20. The method of claim 19, further comprising removing the at least one remote magnet to set the local magnet at a position relative to the fluidic channel that causes the local magnet to maintain the at least one mobile component in the internal tuned position within the fluidic channel without expending power.

* * * * *